United States Patent
Nagahara

(10) Patent No.: US 7,242,348 B2
(45) Date of Patent: Jul. 10, 2007

(54) SATELLITE INFORMATION UPDATE SYSTEM, POSITIONING AUXILIARY INFORMATION PROVISION DEVICE, POSITIONING AUXILIARY INFORMATION PROVISION DEVICE CONTROL METHOD, POSITIONING AUXILIARY INFORMATION PROVISION DEVICE CONTROL PROGRAM, AND COMPUTER READABLE RECORDING MEDIUM HAVING RECORDED THEREIN POSITIONING AUXILIARY INFORMATION PROVISION DEVICE CONTROL PROGRAM

(75) Inventor: Mikio Nagahara, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 26 days.

(21) Appl. No.: 11/180,696

(22) Filed: Jul. 14, 2005

(65) Prior Publication Data

US 2006/0012517 A1    Jan. 19, 2006

(30) Foreign Application Priority Data

Jul. 14, 2004   (JP)   ............... 2004-207348

(51) Int. Cl.
*G01S 1/00*     (2006.01)

(52) U.S. Cl. ................. 342/357.09; 342/357.13; 342/357.15

(58) Field of Classification Search ........... 342/357.01, 342/357.02, 357.06, 357.09, 357.13, 357.15
See application file for complete search history.

(56) References Cited

U.S. PATENT DOCUMENTS

| 6,313,787 B1 | 11/2001 | King et al. |
| 6,429,808 B1 | 8/2002 | King et al. |
| 2002/0111171 A1 | 8/2002 | Boesch et al. |
| 2003/0218567 A1 | 11/2003 | Pitt et al. |

FOREIGN PATENT DOCUMENTS

JP    2002-221565 A    8/2002

*Primary Examiner*—Dao L. Phan
(74) *Attorney, Agent, or Firm*—Global IP Counselors, LLP

(57) ABSTRACT

A positioning auxiliary information provision device 30 has: a auxiliary information generation device to generate positioning auxiliary information including satellite information; a satellite information update necessity determination device to determine the necessity of updating the satellite information; a satellite information update notification information generation device to generate satellite information update notification information indicating that the satellite information needs to be updated based on the determination result of the satellite information update necessity determination device; a positioning auxiliary information transmission device to transmit the positioning auxiliary information via a mediation device 60 to terminal devices 80a to 80c indicated in provision target terminal information; and a satellite information update notification information transmission device to transmit the satellite information update notification information via the mediation device 60 to the terminal devices 80a to 80c indicated in the provision target terminal information.

15 Claims, 16 Drawing Sheets

FIG. 7A SATELLITE INFORMATION 122A

| SATELLITE ID | 1 | 2 | 3 | 4 | 5 |
|---|---|---|---|---|---|
| SATELLITE CONDITION | SATELLITE HEALTH CONDITION | SATELLITE HEALTH CONDITION | SATELLITE HEALTH CONDITION | SATELLITE HEALTH CONDITION | SATELLITE HEALTH CONDITION |
| CLOCK CORRECTION COEFFICIENT | CLOCK CORRECTION INFORMATION | CLOCK CORRECTION INFORMATION | CLOCK CORRECTION INFORMATION | CLOCK CORRECTION INFORMATION | CLOCK CORRECTION INFORMATION |
| EPHEMERIS | SATELLITE ORBIT INFORMATION | SATELLITE ORBIT INFORMATION | SATELLITE ORBIT INFORMATION | SATELLITE ORBIT INFORMATION | SATELLITE ORBIT INFORMATION |
| IONOSPHERE DELAY CORRECTION COEFFICIENT | IONOSPHERE DELAY MODEL | IONOSPHERE DELAY MODEL | IONOSPHERE DELAY MODEL | IONOSPHERE DELAY MODEL | IONOSPHERE DELAY MODEL |
| UTC MODEL | UTC-RELATED INFORMATION | UTC-RELATED INFORMATION | UTC-RELATED INFORMATION | UTC-RELATED INFORMATION | UTC-RELATED INFORMATION |
| ALMANAC | ORBIT INFORMATION OF ALL SATELLITES | ORBIT INFORMATION OF ALL SATELLITES | ORBIT INFORMATION OF ALL SATELLITES | ORBIT INFORMATION OF ALL SATELLITES | ORBIT INFORMATION OF ALL SATELLITES |

FIG. 7B SATELLITE INFORMATION 122B

| SATELLITE ID | 2 | 3 | 4 | 5 |
|---|---|---|---|---|
| SATELLITE CONDITION | SATELLITE HEALTH CONDITION | SATELLITE HEALTH CONDITION | SATELLITE HEALTH CONDITION | SATELLITE HEALTH CONDITION |
| CLOCK CORRECTION COEFFICIENT | CLOCK CORRECTION INFORMATION | CLOCK CORRECTION INFORMATION | CLOCK CORRECTION INFORMATION | CLOCK CORRECTION INFORMATION |
| EPHEMERIS | SATELLITE ORBIT INFORMATION | SATELLITE ORBIT INFORMATION | SATELLITE ORBIT INFORMATION | SATELLITE ORBIT INFORMATION |
| IONOSPHERE DELAY CORRECTION COEFFICIENT | IONOSPHERE DELAY MODEL | IONOSPHERE DELAY MODEL | IONOSPHERE DELAY MODEL | IONOSPHERE DELAY MODEL |
| UTC MODEL | UTC-RELATED INFORMATION | UTC-RELATED INFORMATION | UTC-RELATED INFORMATION | UTC-RELATED INFORMATION |
| ALMANAC | ORBIT INFORMATION OF ALL SATELLITES | ORBIT INFORMATION OF ALL SATELLITES | ORBIT INFORMATION OF ALL SATELLITES | ORBIT INFORMATION OF ALL SATELLITES |

FIG. 9A  SERVER-SIDE SATELLITE INFORMATION 232A
(NW SATELLITE INFORMATION 344A, TERMINAL-SIDE SATELLITE INFORMATION 424A)

| SATELLITE ID | 1 | 2 | 3 | 4 | 5 |
|---|---|---|---|---|---|
| SATELLITE CONDITION | SATELLITE HEALTH CONDITION | SATELLITE HEALTH CONDITION | SATELLITE HEALTH CONDITION | SATELLITE HEALTH CONDITION | SATELLITE HEALTH CONDITION |
| CLOCK CORRECTION COEFFICIENT | CLOCK CORRECTION INFORMATION | CLOCK CORRECTION INFORMATION | CLOCK CORRECTION INFORMATION | CLOCK CORRECTION INFORMATION | CLOCK CORRECTION INFORMATION |
| EPHEMERIS | SATELLITE ORBIT INFORMATION | SATELLITE ORBIT INFORMATION | SATELLITE ORBIT INFORMATION | SATELLITE ORBIT INFORMATION | SATELLITE ORBIT INFORMATION |
| IONOSPHERE DELAY CORRECTION COEFFICIENT | IONOSPHERE DELAY MODEL | IONOSPHERE DELAY MODEL | IONOSPHERE DELAY MODEL | IONOSPHERE DELAY MODEL | IONOSPHERE DELAY MODEL |
| UTC MODEL | UTC-RELATED INFORMATION | UTC-RELATED INFORMATION | UTC-RELATED INFORMATION | UTC-RELATED INFORMATION | UTC-RELATED INFORMATION |
| ALMANAC | ORBIT INFORMATION OF ALL SATELLITES | ORBIT INFORMATION OF ALL SATELLITES | ORBIT INFORMATION OF ALL SATELLITES | ORBIT INFORMATION OF ALL SATELLITES | ORBIT INFORMATION OF ALL SATELLITES |

FIG. 9B  SERVER-SIDE SATELLITE INFORMATION 232B
(NW SATELLITE INFORMATION 344B, TERMINAL-SIDE SATELLITE INFORMATION 424B)

| SATELLITE ID | 2 | 3 | 4 | 5 |
|---|---|---|---|---|
| SATELLITE CONDITION | SATELLITE HEALTH CONDITION | SATELLITE HEALTH CONDITION | SATELLITE HEALTH CONDITION | SATELLITE HEALTH CONDITION |
| CLOCK CORRECTION COEFFICIENT | CLOCK CORRECTION INFORMATION | CLOCK CORRECTION INFORMATION | CLOCK CORRECTION INFORMATION | CLOCK CORRECTION INFORMATION |
| EPHEMERIS | SATELLITE ORBIT INFORMATION | SATELLITE ORBIT INFORMATION | SATELLITE ORBIT INFORMATION | SATELLITE ORBIT INFORMATION |
| IONOSPHERE DELAY CORRECTION COEFFICIENT | IONOSPHERE DELAY MODEL | IONOSPHERE DELAY MODEL | IONOSPHERE DELAY MODEL | IONOSPHERE DELAY MODEL |
| UTC MODEL | UTC-RELATED INFORMATION | UTC-RELATED INFORMATION | UTC-RELATED INFORMATION | UTC-RELATED INFORMATION |
| ALMANAC | ORBIT INFORMATION OF ALL SATELLITES | ORBIT INFORMATION OF ALL SATELLITES | ORBIT INFORMATION OF ALL SATELLITES | ORBIT INFORMATION OF ALL SATELLITES |

CACHE INVALIDATION INFORMATION 236
(NW CACHE INVALIDATION INFORMATION 346)

INVALIDATION TARGET SATELLITE ID: 1

DELIVERY DESTINATION INFORMATION 246 (NW DELIVERY DESTINATION INFORMATION 352)

| NODE ID | bb11 | bc12 | bd13 | bf14 |
|---|---|---|---|---|
| COMMUNICATION ADDRESS | bbbb11 | bbccc2 | bbddd3 | bbfff4 |
| DELIVERY TIME | W | X | Y | Z |
| DELIVERY SATELLITE ID | 1,2,3,4,5 | 2,3,4,5,6 | 3,4,5,6,7 | 4,5,6,7 |

FIG. 12

SATELLITE INFORMATION UPDATE SYSTEM, POSITIONING AUXILIARY INFORMATION PROVISION DEVICE, POSITIONING AUXILIARY INFORMATION PROVISION DEVICE CONTROL METHOD, POSITIONING AUXILIARY INFORMATION PROVISION DEVICE CONTROL PROGRAM, AND COMPUTER READABLE RECORDING MEDIUM HAVING RECORDED THEREIN POSITIONING AUXILIARY INFORMATION PROVISION DEVICE CONTROL PROGRAM

CROSS-REFERENCE TO RELATED APPLICATIONS

This application claims priority to Japanese Patent Application No. 2004-207348. The entire disclosure of Japanese Patent Application No. 2004-207348 is hereby incorporated herein by reference.

BACKGROUND OF THE INVENTION

1. Field of the Invention

The present invention relates to a satellite information update system. More specifically, the present invention relates to a satellite information update system, a positioning auxiliary information provision device, a positioning auxiliary information provision device control method, a positioning auxiliary information provision device control program, and a computer readable recording medium having recorded therein the positioning auxiliary information provision device control program, which are related to positioning processing based on a signal form a position information satellite.

2. Background Information

A positioning system for determining the current position of a SPS receiver by utilizing a satellite navigation system using a position information satellite, for example, a SPS (Satellite Positioning System), has conventionally been put to practical use. Among SPS receivers used in such a positioning system, there are some that have a mechanism to receive satellite information, including satellite orbit information, etc., by radio communication from an external device, thus seeking to shorten positioning time and improve positioning precision. Such SPS receivers having satellite information stored in a storage device are configured to use the satellite information stored in the storage device when performing positioning operations. When this storage device is a high-speed storage device, for example, a cache memory inside a hard disk, the satellite information can be browsed at high speed.

On the contrary, although satellite information from a specific SPS satellite has stopped being delivered due to a malfunction of the SPS satellite or the like, the aforesaid SPS receiver has the satellite information of the SPS satellite stored in the cache memory, in which case positioning processing is started based on the invalid satellite information. Consequently, the aforesaid SPS receiver cannot acquire an accurate positioning result, which therefore results in the wasteful consumption of processing time, processing power, and electric power.

An SPS position detection system, which utilizes a control channel to receive periodically SPS positioning assistant information transmitted periodically from a radio base station, has been proposed to deal with this problem such a system is disclosed in JP-A-2002-221565 which is hereby incorporated by reference. However, in the aforesaid SPS position detection system, information other than information indicating that the satellite information is to be updated is also periodically transmitted and received, which therefore provides a heavy burden with regards to information processing on the satellite information transmission and reception sides.

In view of the above, it will be apparent to those skilled in the art from this disclosure that there exists a need for an improved a satellite information update system, a positioning auxiliary information provision device, a positioning auxiliary information provision device control method, a positioning auxiliary information provision device control program, and a computer readable recording medium. This invention addresses this need in the art as well as other needs, which will become apparent to those skilled in the art from this disclosure.

SUMMARY OF THE INVENTION

An object of the present invention is to provide a satellite information update system, a positioning auxiliary information provision device, a positioning auxiliary information provision device control method, a positioning auxiliary information provision device control program, and a computer readable recording medium having recorded therein the positioning auxiliary information provision device control program, in which only information indicating that satellite information need be updated can be provided at the time the satellite information needs to be updated.

According to a first aspect of the present invention, the aforesaid object can be realized by a satellite information update system has a satellite base station, a positioning auxiliary information provision device, and a plurality of terminal devices. The satellite base station has a satellite information generation device to generate satellite information based on a position-related signal from a position information satellite. The positioning auxiliary information provision device is capable of communicating with the satellite base station. The plurality of terminal devices is capable of communicating with the positioning auxiliary information provision device via a mediation device to mediate the communication. Further, the positioning auxiliary information provision device includes a satellite information acquisition device, a satellite information storage device, an auxiliary information generation device, a satellite information update necessity determination device, a satellite information update device, a satellite information update notification information generation device, a provision target terminal information storage device, a positioning auxiliary information transmission device, and a satellite information update notification information transmission device. The satellite information acquisition device acquires satellite information from the satellite base station. The satellite information storage device stores the satellite information. The auxiliary information generation device generates positioning auxiliary information including the satellite information; satellite information update necessity determination device determine the necessity of updating the satellite information. The satellite information update device update the satellite information stored in the satellite information storage device based on the determination result of the satellite information update necessity determination device. The satellite information update notification information generation device generates satellite information update notification information indicating that the satellite information needs to be updated based on the determination result of the satellite information update necessity determination device. The provision target terminal information storage device stores provision target terminal information indicative of the plurality of terminal devices serving as targets to be provided with the positioning auxiliary information and the satellite information update notification information. The positioning auxiliary information transmission device transmits the positioning auxiliary information, via the mediation device, to the terminal devices indicated in the provision target terminal information. The satellite information update notification information transmission device transmits the satellite information update notification information, via the mediation device, to the terminal devices indicated in the provision target terminal information. The mediation device includes a mediation device-side satellite information storage device, a mediation device-side satellite information update device, a mediation target terminal information storage device, a positioning auxiliary information transmission device, and a mediation device-side satellite information update notification information transmission device. The mediation device-side satellite information storage device stores the satellite information included in the positioning auxiliary information acquired from the positioning auxiliary information provision device. The mediation device-side satellite information update device updates the satellite information stored in the mediation device-side satellite information storage device based on the satellite information update notification information acquired from the positioning auxiliary information provision device. The mediation target terminal information storage device stores mediation target terminal information indicative of mediation target terminal devices that are the plurality of terminal devices serving as mediation targets to be provided with the positioning auxiliary information. The positioning auxiliary information transmission device transmits the positioning auxiliary information received from the positioning auxiliary information provision device to the terminal devices indicated in the mediation target terminal information. The mediation device-side satellite information update notification information transmission device transmits the satellite information update notification information received from the positioning auxiliary information provision device to the terminal devices indicated in the mediation target information. Each terminal device each includes a terminal-side satellite information storage device and a terminal-side satellite information update device. The terminal-side satellite information storage device stores the satellite information included in the positioning auxiliary information acquired via the mediation device from the positioning auxiliary information provision device. The terminal-side satellite information update device updates the satellite information stored in the terminal-side satellite information storage device based on the satellite information update notification information acquired via the mediation device from the positioning auxiliary information provision device.

According to the configuration of the first aspect of the present invention, the positioning auxiliary information with which the terminal devices are supplied from the positioning auxiliary information device includes the satellite information.

As mentioned, a conventional SPS receiver that is an example of the terminal device having the satellite information stored in a storage device, for example, a cache memory inside a hard disk, sometimes performs a positioning operation by using the satellite information stored in the cache memory. Further, although the position-related signal from a specific SPS satellite that is an example of the position information satellite has stopped being delivered due to malfunction of the SPS satellite or the like, the SPS receiver has the satellite information of the SPS satellite stored in the cache memory, in which case the SPS receiver starts positioning processing by using the invalid satellite information. However, the SPS receiver cannot acquire the positioning result, thus resulting in the wasteful consumption of processing time, processing power, and electric power.

In this respect, according to the configuration of the first aspect of the present invention, the positioning auxiliary information provision device has the satellite information update necessity determination device and therefore can determine the necessity of updating the satellite information. Further, the positioning auxiliary information provision device has the satellite information update notification information generation device and therefore can generate the satellite information update notification information. Furthermore, the positioning auxiliary information provision device can cause the satellite information update notification information transmission device to transmit the satellite information update notification information via the mediation device to the terminal devices indicated in the provision target terminal information.

In other words since the satellite information has stopped being delivered and for such reasons, the positioning auxiliary information provision device determines that the satellite information is invalid and needs to be updated. Thus, based on the determination result of the satellite information update necessity determination device, the positioning auxiliary information provision device generates the satellite information update notification information indicating that the satellite information need be updated. Further, the positioning auxiliary information provision device transmits only the satellite information update notification information to the terminal devices. Besides, the positioning auxiliary information provision device generates and transmits the satellite information update notification information at the time it determines that the satellite information needs to be updated. Thereby, only information indicating that the satellite information needs to be updated can be provided at the time the satellite information needs to be updated.

Furthermore, the positioning auxiliary information provision device has the satellite information update device. Consequently, the positioning auxiliary information provision device can update the satellite information stored in the satellite information storage device of the positioning auxiliary information provision device itself, for example, a cache memory inside a hard disk. Thereby, even upon receipt of a request from a terminal device that is not indicated in the provision target terminal information, the positioning auxiliary information provision device can provide the positioning auxiliary information including the latest satellite information.

Moreover, the positioning auxiliary information provision device transmits the satellite information update notification information via the mediation device to the terminal devices indicated in the provision target terminal information. Consequently, the mediation device can update the satellite information stored in the mediation device-side satellite information storage device, for example, a cache memory inside a hard disk. Further, the terminal devices can update the satellite information stored in the terminal device-side satellite information storage device.

According to a second aspect of the present invention, the aforesaid object is realized by a positioning auxiliary information provision device capable of communicating with a satellite base station having a satellite information generation device to generate satellite information based on a position-related signal from a position information satellite. The positioning auxiliary information provision device has a satellite information acquisition device, a satellite information storage device, an auxiliary information storage device, a satellite information update necessity device, a satellite information update device, a satellite information update notification information generation device, a provision target terminal information storage device, a positioning auxiliary information transmission device, and a satellite information update notification information transmission device. The satellite information acquisition device acquires the satellite information from the satellite base station. The satellite information storage device stores the satellite information. The auxiliary information generation device generates positioning auxiliary information including the satellite information. The satellite information update necessity determination device determines the necessity of updating the satellite information. The satellite information update device update the satellite information stored in the satellite information storage device, based on the determination result of the satellite information update necessity determination device. The satellite information update notification information generation device generates satellite information update notification information indicating that the satellite information needs to be updated based on the determination result of the satellite information update necessity determination device. The provision target terminal information storage device stores provision target terminal information indicative of a plurality of terminal devices serving as targets to be provided with the positioning auxiliary information and the satellite information update notification information. The positioning auxiliary information transmission device transmits the positioning auxiliary information via a mediation device for mediating the communication to the terminal devices indicated in the provision target terminal information. The satellite information update notification information transmission device transmits the satellite information update notification information via the mediation device to the terminal devices indicated in the provision target terminal information.

According to the configuration of the second aspect of the present invention, similar to the configuration of the first invention, only information indicating that the satellite information needs to be updated can be provided at the time the satellite information needs to be updated.

A third aspect of the present invention provides the positioning auxiliary information provision device according to the configuration of the second aspect of the present invention, wherein the satellite information update necessity determination device is configured to determine whether all or part of the satellite information is invalid or not.

According to the configuration of the third aspect if the present invention, the satellite information update necessity determination device determines whether all or part of the satellite information is invalid or not. Consequently, the satellite information update notification information transmission device can transmit the satellite information update notification information indicating that all or part of the satellite information is invalid.

Thereby, the mediation device or the like, which have received the satellite information update notification information, deletes the invalidated satellite information from its respective information storage device and thereby avoids performing positioning processing using the invalid satellite information. Thus, the wasteful consumption of processing time, processing power, and electric power can be prevented from occurring.

A fourth aspect of the present invention provides the positioning auxiliary information provision device according to the configuration of the third aspect, further includes a coverage area information storage device and an in or out of coverage area determination device. The coverage area information storage device stores coverage area information indicative of a coverage area within which the satellite base station can receive the position-related signal from the position information satellite. The in or out of coverage area determination device determines whether or not the position information satellite is positioned within the coverage area. Further, the satellite information update necessity determination device is configured when it cannot receive from the satellite base station the satellite information corresponding to the position information satellite existing within the coverage area corresponding to the satellite base station to determine that the satellite information corresponding to the position information satellite is invalid.

As long as the position information satellite exists within the coverage area and transmits the position-related signal, the satellite base station should receive the position-related signal from the position information satellite. Therefore, the satellite information corresponding to the aforesaid position information satellite should be able to be transmitted to the positioning auxiliary information provision device.

Accordingly, although the position information satellite exists within the coverage area, the satellite base station cannot transmit the satellite information corresponding to the position information satellite to the positioning auxiliary information provision device, which means that the satellite base station does not receive the position-related signal from the position information satellite. The reason is considered to be that the aforesaid position information satellite cannot transmit the position-related signal due to a malfunction or the like.

In this respect, according the configuration to the fourth aspect of the present invention, the positioning auxiliary information provision device has the in or out of the coverage area determination device and therefore can determine whether or not the position information satellite is positioned within the coverage area. Further, the positioning auxiliary information provision device is configured, when it cannot receive from the satellite base station the satellite information corresponding to the position information satellite existing within the coverage area corresponding to the satellite base station to determine that the satellite information corresponding to the position information satellite is invalid. Consequently, it is possible to determine whether the satellite information corresponding to the position information satellite is invalid or not.

A fifth aspect of the present invention provides the positioning auxiliary information provision device according to the configuration of the fourth aspect of the present invention, wherein the satellite information update necessity determination device is configured, when it cannot receive from any of a plurality of the satellite base stations the satellite information corresponding to the position information satellite to determine that the satellite information corresponding to the position information satellite is invalid.

As long as the position information satellite exists within the coverage area, the satellite base station should be able to receive the position-related signal from the position information satellite. Therefore, the satellite information corresponding to the aforesaid position information satellite should be able to be transmitted to the positioning auxiliary information provision device. However, it is considered that the positioning auxiliary information provision device may make an error in determining whether or not the position information satellite exists within the coverage area, for example, due to the error of a navigation message including satellite orbit information or the like, that is carried on the position-related signal received from the position information satellite. When the satellite information corresponding to the position information satellite is determined invalid although the position information satellite exists outside the coverage area while transmitting the position-related signal, then it becomes impossible to use the originally valid satellite information.

In this respect, the satellite information update necessity determination device, determines that the satellite information corresponding to the position information satellite is invalid when it cannot receive the satellite information corresponding to the position information satellite from any of the plurality of the satellite base stations. In other words, the satellite information update necessity determination device does not determine that the satellite information corresponding to the position information satellite is invalid even when it cannot receive from one of the satellite base stations the satellite information corresponding to the position information satellite. Rather, the satellite information update necessity determination device, determines that the satellite information corresponding to the position information satellite is invalid when it cannot receive from any of the plurality of the satellite base stations the satellite information corresponding to the position information satellite from any of the plurality of the satellite base stations. Thus, the originally valid satellite information can be prevented from being erroneously determined invalid.

A sixth aspect of the present invention provides the positioning auxiliary information provision device according to the configuration of any one of the fourth and fifth aspects, wherein the satellite information update necessity determination device is configured when the satellite information corresponding to the position information satellite cannot be received within an allowable time range to determine that the satellite information corresponding to the position information satellite is invalid.

The condition in which the satellite base station cannot receive the position-related signal from the position information satellite is not limited to the case in which the position information satellite malfunctions or such cases. In other words, when an obstacle such as, e.g., a high-rise building exists between the satellite base station and the position information satellite, there also occurs a condition in which the satellite base station cannot receive the position-related signal from the position information satellite. In this case, the satellite information corresponding to the position information satellite can be used because it has valid information. Further, it is for only a certain time that the position-related signal is blocked by an obstacle such as a high-rise building. In other words, the condition in which the position-related signal is blocked by an obstacle such as a high-rise building should be eliminated after a certain amount of time elapses.

In this respect, according to the configuration of the sixth aspect, the configuration is such that when the satellite information corresponding to the position information satellite cannot be received within the allowable time range, the satellite information corresponding to the position information satellite is determined invalid. Consequently, it is possible to determine reliably whether the satellite information is invalid or not.

According to a seventh aspect of the present invention, the aforesaid object is realized by a positioning auxiliary information provision device control method. The method includes a satellite information acquisition step in which a positioning auxiliary information provision device, capable of communicating with a satellite base station to generate satellite information based on a position-related signal from a position information satellite, acquires the satellite information from the satellite base station; a satellite information storage step in which the positioning auxiliary information provision device stores the satellite information; a positioning auxiliary information generation step in which the positioning auxiliary information provision device generates positioning auxiliary information including the satellite information; a positioning auxiliary information transmission step in which the positioning auxiliary information provision device transmits the positioning auxiliary information via a mediation device for mediating the communication to a plurality of terminal devices serving as targets to be provided with the positioning auxiliary information; a satellite information update necessity determination step in which the positioning auxiliary information provision device determines the necessity of updating the satellite information; a satellite information update step in which when determining in the satellite information update necessity determination step, that the satellite information needs to be updated, the positioning auxiliary information provision device updates the satellite information stored in a satellite information storage device; a satellite information update notification information generation step in which when determining in the satellite information update necessity determination step that the satellite information needs to be updated, the positioning auxiliary information provision device generates satellite information update notification information indicating that the satellite information needs to be updated; and a satellite information update notification information transmission step of transmitting the satellite information update notification information via the mediation device to the plurality of terminal devices serving as targets to be provided with the satellite information update notification information.

According to an eighth aspect of the present invention, the aforesaid object is realized by a positioning auxiliary information provision device control program. The program allows a computer to conduct: a satellite information acquisition step in which a positioning auxiliary information provision device, capable of communicating with a satellite base station to generate satellite information based on a position-related signal from a position information satellite, acquires the satellite information from the satellite base station; a satellite information storage step in which the positioning auxiliary information provision device stores the satellite information; a positioning auxiliary information generation step in which the positioning auxiliary information provision device generates positioning auxiliary information including the satellite information; a positioning auxiliary information transmission step in which the positioning auxiliary information provision device transmits the positioning auxiliary information via a mediation device to mediate the communication to a plurality of terminal devices serving as targets to be provided with the positioning auxiliary information; a satellite information update necessity determination step in which the positioning auxiliary information provision device determines the necessity of updating the satellite information; a satellite information update step in which when determining that the satellite information needs to be updated in the satellite information update necessity determination step, the positioning auxiliary information provision device updates the satellite information stored in a satellite information storage device; a satellite information update notification information generation step in which when determining in the satellite information update necessity determination step that the satellite information needs to be updated, the positioning auxiliary information provision device generates satellite information update notification information indicating that the satellite information needs to be updated; and a satellite information update notification information transmission step of transmitting the satellite information update notification information via the mediation device to the plurality of terminal devices serving as targets to be provided with the satellite information update notification information.

According to a ninth aspect of the present invention, the aforesaid object is realized by a computer readable recording medium having recorded therein a positioning auxiliary information provision device control program. The computer readable recording medium allows a computer to conduct: a satellite information acquisition step in which a positioning auxiliary information provision device, capable of communicating with a satellite base station for generating satellite information based on a position-related signal from a position information satellite, acquires the satellite information from the satellite base station; a satellite information storage step in which the positioning auxiliary information provision device stores the satellite information; a positioning auxiliary information generation step in which the positioning auxiliary information provision device generates positioning auxiliary information including the satellite information; a positioning auxiliary information transmission step in which the positioning auxiliary information provision device transmits the positioning auxiliary information via a mediation device for mediating the communication to a plurality of terminal devices serving as targets to be provided with the positioning auxiliary information; a satellite information update necessity determination step in which the positioning auxiliary information provision device determines the necessity of updating the satellite information; a satellite information update step in which when determining in the satellite information update necessity determination step that the satellite information needs to be updated, the positioning auxiliary information provision device updates the satellite information stored in a satellite information storage device; a satellite information update notification information generation step in which when determining in the satellite information update necessity determination step that the satellite information need be updated, the positioning auxiliary information provision device generates satellite information update notification information indicating that the satellite information needs to be updated; and a satellite information update notification information transmission step of transmitting the satellite information update notification information via the mediation device to the plurality of terminal devices serving as targets to be provided with the satellite information update notification information.

These and other objects, features, aspects, and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIGS. 7 and 7B are views of diagrams showing examples of satellite information in the cache system;

FIGS. 9A and 9B are views of diagrams showing examples of server-side satellite information in the cache system;

FIG. 12 is a view of a diagram showing examples of delivery destination information in the cache system;

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

The embodiments to be described below are preferred specific examples of the invention and therefore are given various technically preferable limitations, but the scope of the invention is not limited to these embodiments in so far as there is no statement in the following description to the effect of limiting the invention.

First Embodiment

Figure 1:
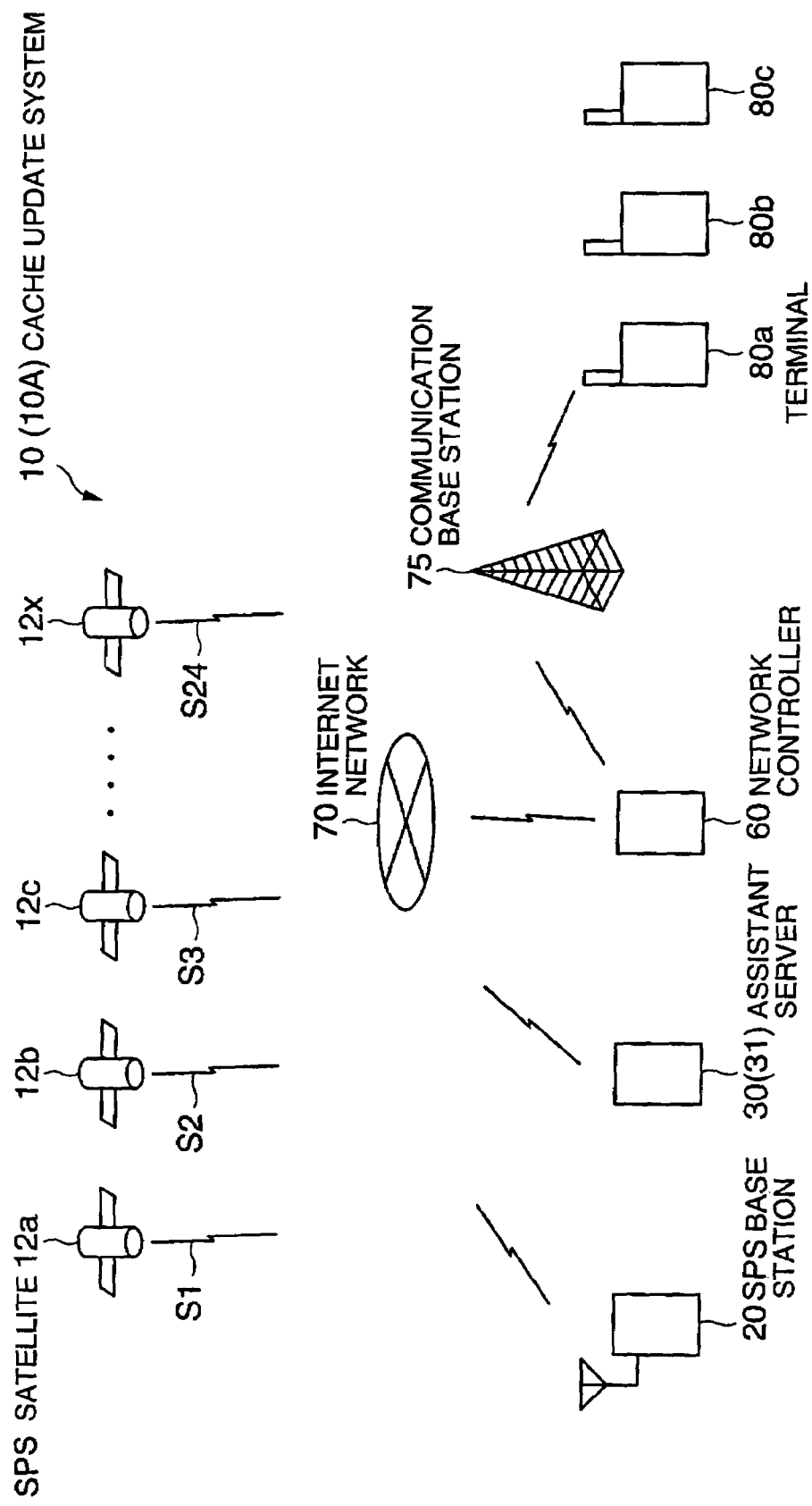
FIG. 1 is a view of a schematic diagram showing a cache update system according to first and second preferred embodiments of the invention.

FIG. 1 is a view of a schematic diagram showing a cache update system 10, which is an example of a satellite information update system, according to a first preferred embodiment of the invention, and like system.

As shown in FIG. 1, the cache update system 10 has an SPS base station 20 that is an example of the satellite base station. This SPS base station 20 receives signals S1 to S24, which are examples of the position-related signal, from SPS satellites 12a to 12x that are examples of the position information satellite. The SPS base station 20 generates satellite information based on the received signals S1. As described later, this satellite information is information including the orbit information and the like of the SPS satellites 12a to 12x.

The cache update system 10 also has an assistant server 30, which is an example of the positioning auxiliary information provision device, capable of communicating with the SPS base station 20. The assistant server 30 receives the aforesaid satellite information from the SPS base station 20 and generates to-be-described assistant information 234 that is an example of the positioning auxiliary information. The assistant information 234 is used in order for terminals 80a, 80b, and 80c, which are examples of the plurality of terminal devices, to determine their current positions based on the signals S1 to S24 from the SPS satellites 12a to 12x. The aforesaid satellite information is included in this assistant information 234, and the terminals 80a, 80b, and 80c acquire the assistant information 234 and thereby can rapidly catch the signals S1 to S24 from the SPS satellites 12a to 12x.

The cache update system 10 further has a network controller 60, which is an example of the mediation device, to mediate communication between the assistant server 30 and the terminals 80a to 80c. This network controller 60 is configured to be capable of communicating with the terminals 80a to 80c via an Internet network 70 and a communication base station 75.

The terminals 80a to 80c are, for example, cellular phones. The terminals 80a to 80c are not limited to cellular phones, but may be PHS (Personal Handyphone System) phones, PDA (Personal Digital Assistance) phones, etc. Besides, the terminals 80a to 80c are not limited to three in number, but need only be plural in number.

Furthermore, unlike this embodiment, the SPS satellites are not limited to 24 in number, but may be, for example, 32 in number.

(Main Hardware Configuration of SPS Base Station 20)

Figure 2:
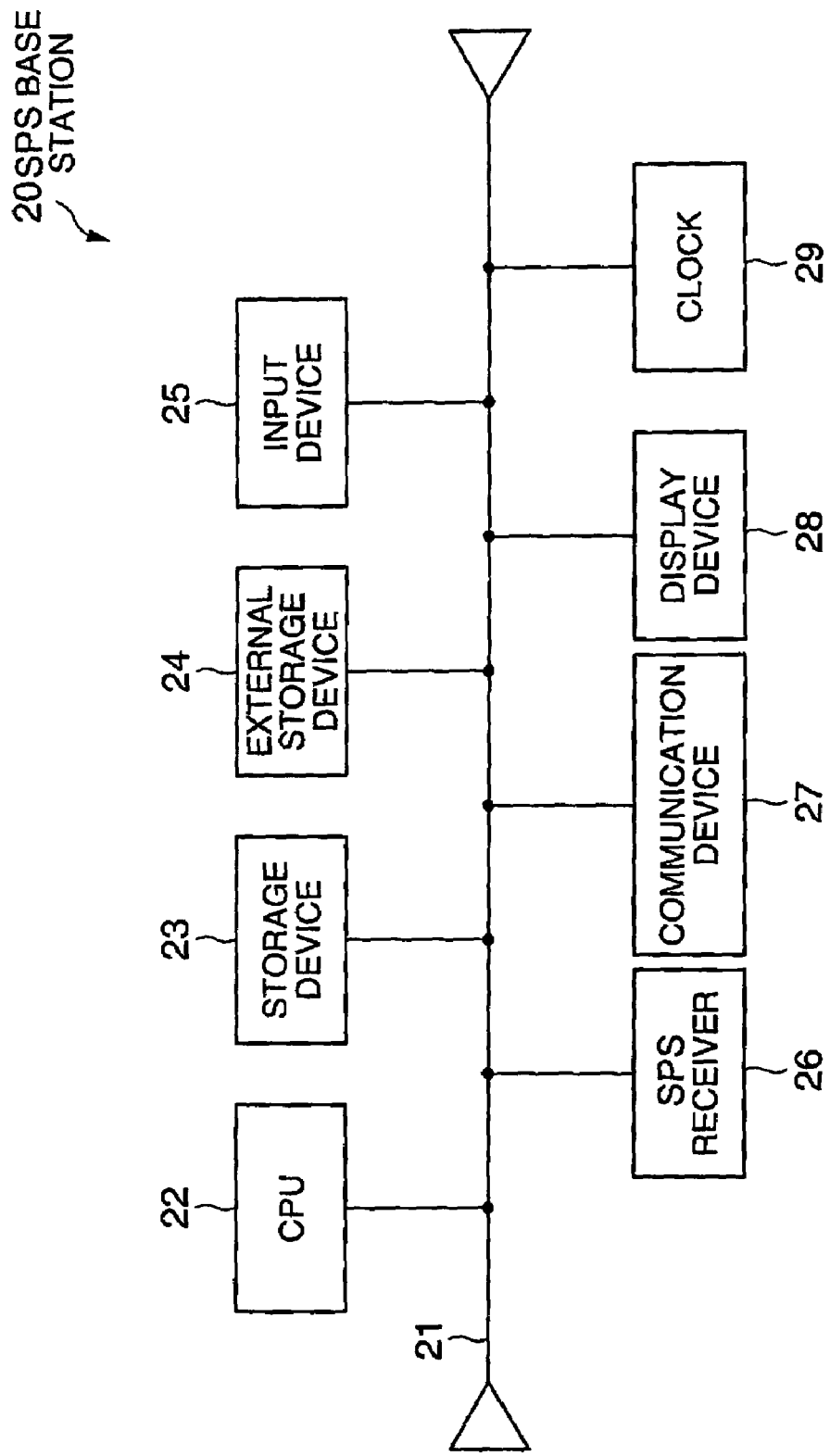
FIG. 2 is a view of a schematic diagram showing the main hardware configuration of a SPS base station of the cache system.

FIG. 2 is a view of a schematic diagram showing the main hardware configuration of the SPS base station 20. As shown in FIG. 2, the SPS base station 20 has a computer, and the computer has a bus 21. The bus is connected a CPU 22, a storage device 23, an external storage device 24, and the like. The storage device 23 is, for example, a RAM (Random Access Memory) and a ROM (Read Only Memory), and the external storage device 24 is, for example, a hard disk.

Besides, connected to this bus 21 are an input device 25 to input a variety of information, an SPS receiver 26 to receive the position-related signals S1 to S24 from the SPS satellites 12a to 12x shown in FIG. 1, and a communication device 27 to communicating with the assistant server 30. Furthermore, a display device 28 to display a variety of information, and a clock 29 are connected to this bus 21.

(Main Hardware Configuration of Assistant Server 30)

Figure 3:
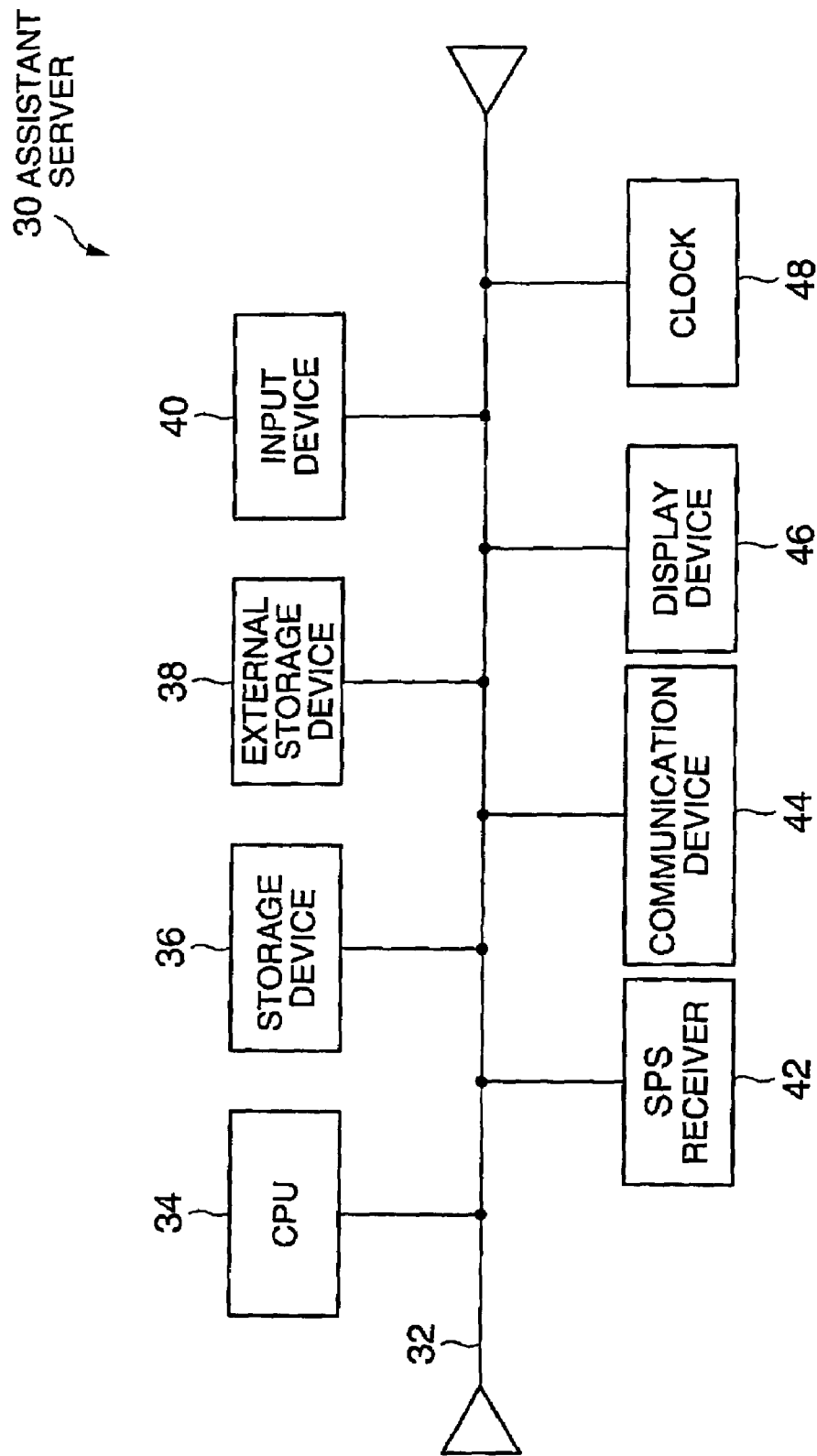
FIG. 3 is a view of a schematic diagram showing the main hardware configuration of an assistant server of the cache system.

FIG. 3 is a view of a schematic diagram showing the main hardware configuration of the assistant server 30. As shown in FIG. 3, the main hardware configuration of the assistant server 30 is the same as or similar to that of the aforesaid SPS base station 20.

(Main Hardware Configuration of Network Controller 60)

Figure 4:
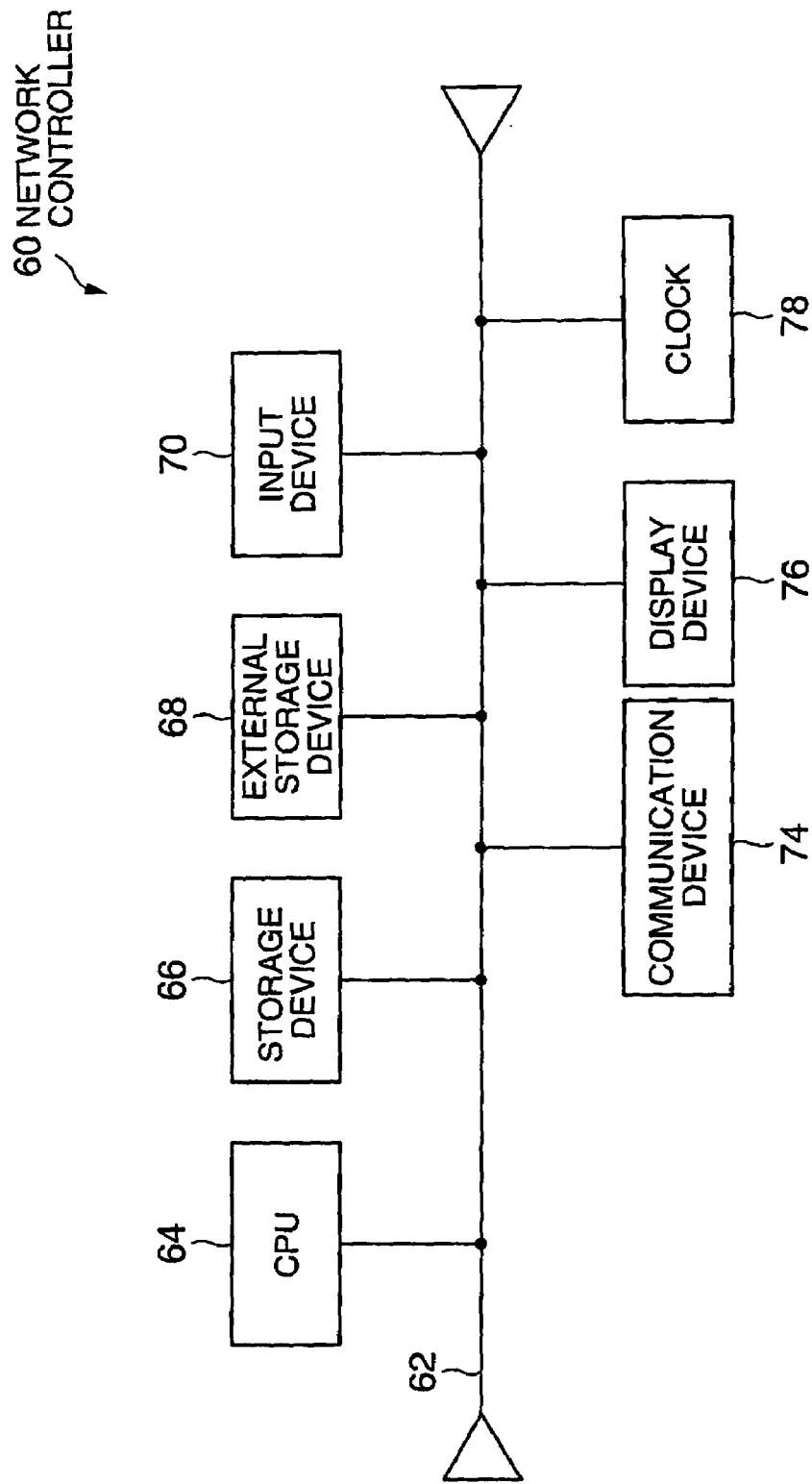
FIG. 4 is a view of a schematic diagram showing the main hardware configuration of a network controller of the cache system.

FIG. 4 is a view of a schematic diagram showing the main hardware configuration of the network controller 60. As shown in FIG. 4, the main hardware configuration of the network controller 60 is substantially the same as that of the aforesaid SPS base station 20 with the main distinguishing feature being that the network controller 60 has no SPS receiver. However, unlike the structure shown in this embodiment, the network controller 60 may have an SPS receiver.

(Main Hardware Configuration of Terminal 80a)

Figure 5:
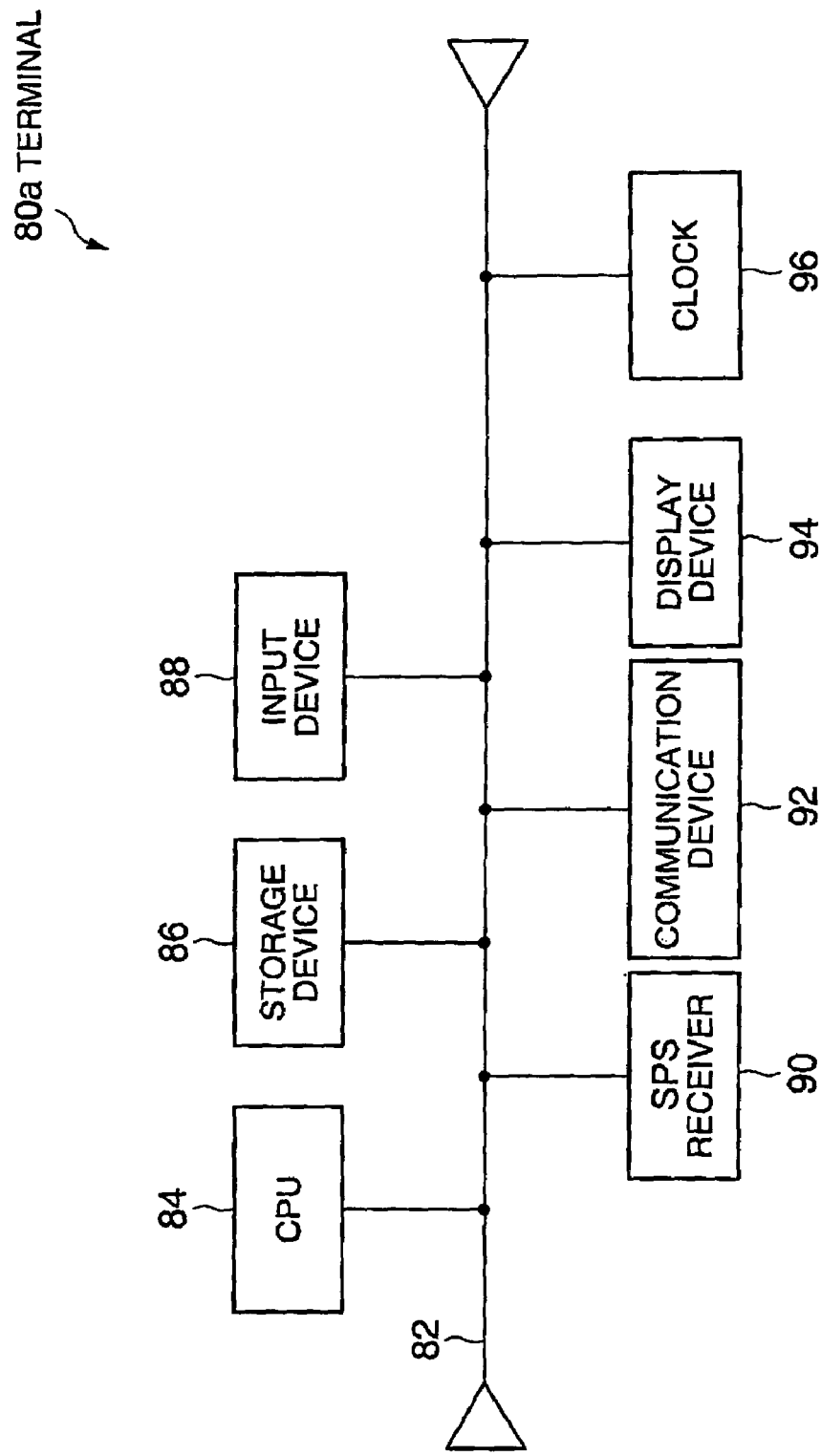
FIG. 5 is a view of a schematic diagram showing the main hardware configuration of a terminal of the cache system.

FIG. 5 is a view of a schematic diagram showing the main hardware configuration of the terminal 80a. As shown in FIG. 5, the main hardware configuration of the terminal 80a is substantially the same as that of the aforesaid SPS base station 20 with the main distinguishing feature being that the terminal 80a has no external storage device. The terminals 80b and 80c have the same hardware configuration as the terminal 80a and thus are description of them is omitted.

(Main Software Configuration of SPS Base Station 20)

Figure 6:
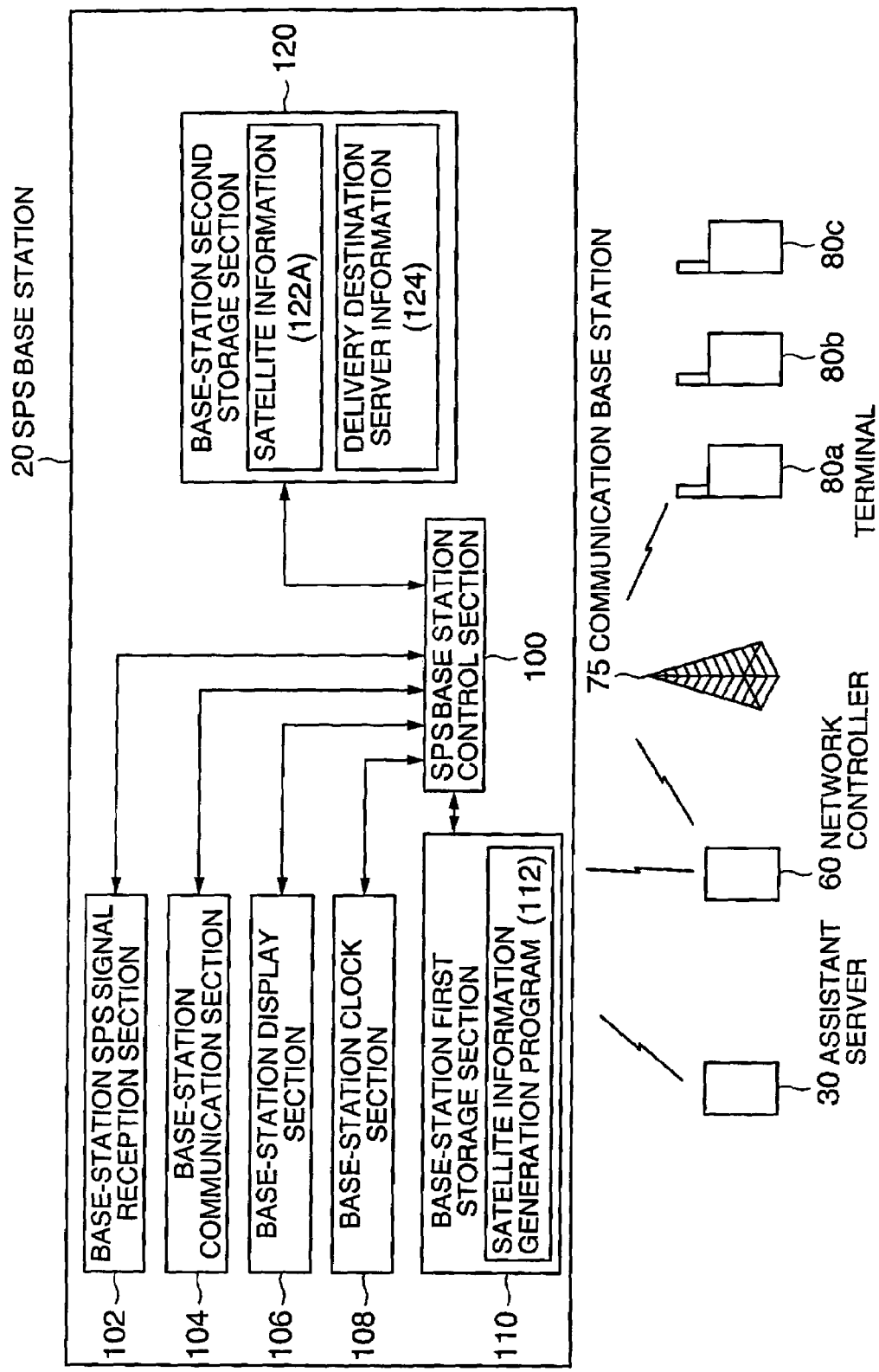
FIG. 6 is a view of a schematic diagram showing the main software configuration and connections of the SPS base station.

FIG. 6 is a view of a schematic diagram of the main software configuration of the SPS base station 20, and its connections to the assistant server 30, network controller 60, communication base station 75, and terminals 80a to 80c. Referring how to FIGS. 2 and 6, the SPS base station 20 has an SPS bas station control section 100, a base station SPS signal, a base station communication section 104, a base station display section 106, and a base station clock section 108. The SPS base station control section 100 controls individual sections. The base station SPS signal reception section 102 corresponds to the SPS receiver 26 shown in FIG. 2. The base station communication section 104 corresponds to the communication device 27 shown in FIG. 2. The base station display section 106 corresponds to the display device 28 shown in FIG. 2. The base station clock section 108 corresponds to the clock 29 shown in FIG. 2.

As shown in FIG. 6, the SPS base station 20 has a base station first storage section 110 to store various programs and a base station second storage section 120 to store a variety of information. Still referring to FIG. 6, the base station first storage section 110 stores a satellite information generation program 112 therein. The satellite information generation program 112 is information used in order for the SPS base station control section 100 to generate to-be-described satellite information 122A and 122B that are examples of the satellite information based on the signals S1 to S24 from the SPS satellites 12a to 12x shown in FIG. 1. In other words, the satellite information generation program 112 and the SPS base station control section 100 are examples of the satellite information generation device.

The SPS base station control section 100 stores the generated satellite information 122A and 122B into the base station second storage section 120.

FIGS. 7A and 7B are views of diagrams showing examples of the satellite information 122A and 122B. As shown in FIG. 7A, the satellite information 122A is the information that indicates a satellite condition, a clock correction coefficient, an ephemeris, etc. in response to individual satellite IDs. For example, 1 can refer to the satellite ID of the SPS satellite 12a, 2 can refer to the satellite ID of the SPS satellite 12b, and so forth.

As shown in FIG. 6, the SPS base station 20 has delivery destination server information 124 stored in the base station second storage section 120. The delivery destination server information 124, which is information about the targets to which the SPS base station 20 delivers the satellite information 122A and 122B includes, for example, the telephone number and Internet address of the assistant server 30 shown in FIG. 1. This enables the SPS base station 20 to provide the assistant server 30 with the satellite information 122A and 122B.

(Main Software Configuration of Assistant Server 30)

Figure 8:
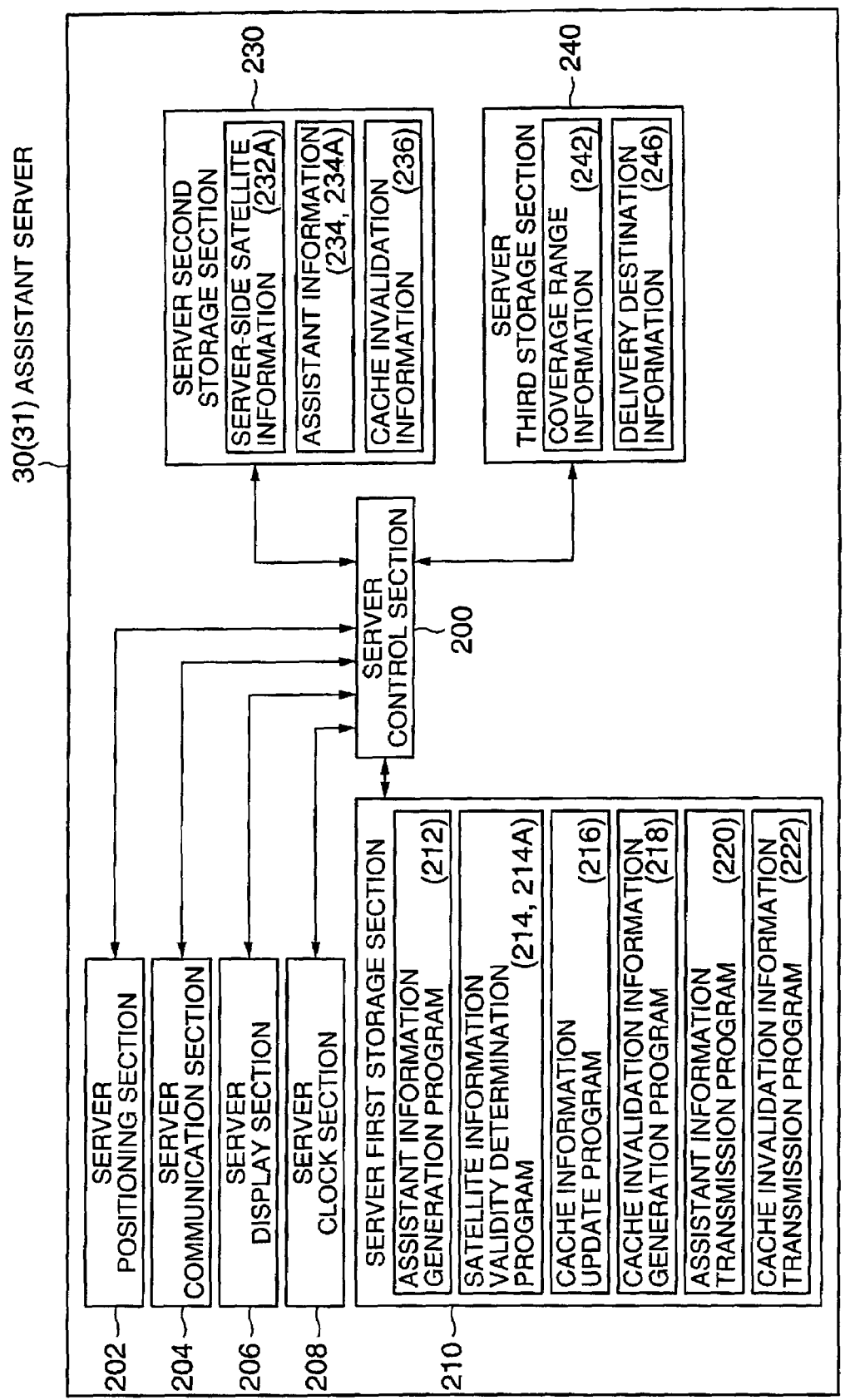
FIG. 8 is a view of a schematic diagram showing the main software configuration of the assistant server.

FIG. 8 is a view of a schematic diagram showing the main software configuration of the assistant server 30. As shown in FIG. 8, the assistant server 30 has a server control section 200, a server positioning section 202, a server communication section 204, a server display section 206, and a server clock section 208. The server control section 200 controls individual sections. Referring now to FIGS. 3 and 8, the server positioning section 202 corresponds to the SPS receiver 42 shown in FIG. 3. The server communication section 204 corresponds to the communication device 44 shown in FIG. 3. The server display section 206 corresponds to the display device 46 shown in FIG. 3. The server clock section 208 corresponds to the clock 48 shown in FIG. 3. The assistant server 30 causes the server communication section 204 to receive from the SPS base station 20 shown in FIG. 6, for example, the satellite information 122A. In other words, the server communication section 204 is an example of the satellite information acquisition device.

As shown in FIG. 8, the assistant server 30 has a server first storage section 210 storing various programs therein, and a server second storage section 230 and a server third storage section 240 that store a variety of information therein. The server second storage section 230 is disposed in a storage device capable of high-speed reading, for example, a cache memory of the external storage device 38 shown in FIG. 3.

The assistant server 30 stores, for example, the satellite information 122A acquired from the SPS base station 20 shown in FIG. 6 into the server second storage section 230 as server-side satellite information 232A. In other words, the server second storage section 230 is an example of the satellite information storage device.

FIGS. 9A and 9B are views of diagrams showing examples of the server-side satellite information 232A and 232B.

As shown in FIG. 9A, the server-side satellite information 232A has the same or similar content as that of the satellite information 122A shown in FIG. 7.

As shown in FIG. 8, the assistant server 30 has an assistant information generation program 212. The assistant information generation program 212 contains information used in order for the server control section 200 to generate assistant information 234 including, for example, the server-side satellite information 232A. In other words, the assistant information generation program 212 and the server control section 200 are examples of the auxiliary information generation device.

The server control section 200 stores the generated assistant information 234 into the server second storage section 230. In other words, the server second storage section 230 is an example of the auxiliary information storage device.

The assistant information 234 is the information that the assistant server 30 provides to the terminals 80a to 80c shown in FIG. 1. Consequently, the assistant information 234 includes the satellite information 232A (see FIG. 9A) and further includes, for example, information about the Doppler effect of the signals S1 to S24 from the SPS satellites 12a to 12x shown in FIG. 1 and information about the observability of the terminals 80a to 80c from the approximate positions thereof.

As shown in FIG. 8, the assistant server 30 has a satellite information validity determination program 214. The satellite information validity determination program 214 is information used in order for the server control section 200 to determine the necessity of updating the server-side satellite information 232A. In other words, the satellite information validity determination program 214 and the server control section 200 are examples of the satellite information update necessity determination device. Specifically, based on the satellite information validity determination program 214, the server control section 200 determines whether all or part of the satellite information 232A (see FIG. 9A) stored in the server second storage section 230 is invalid or not by reference to the satellite information 122B (see FIG. 7B) acquired from the SPS base station 20 shown in FIG. 6.

Figures 10, 11:
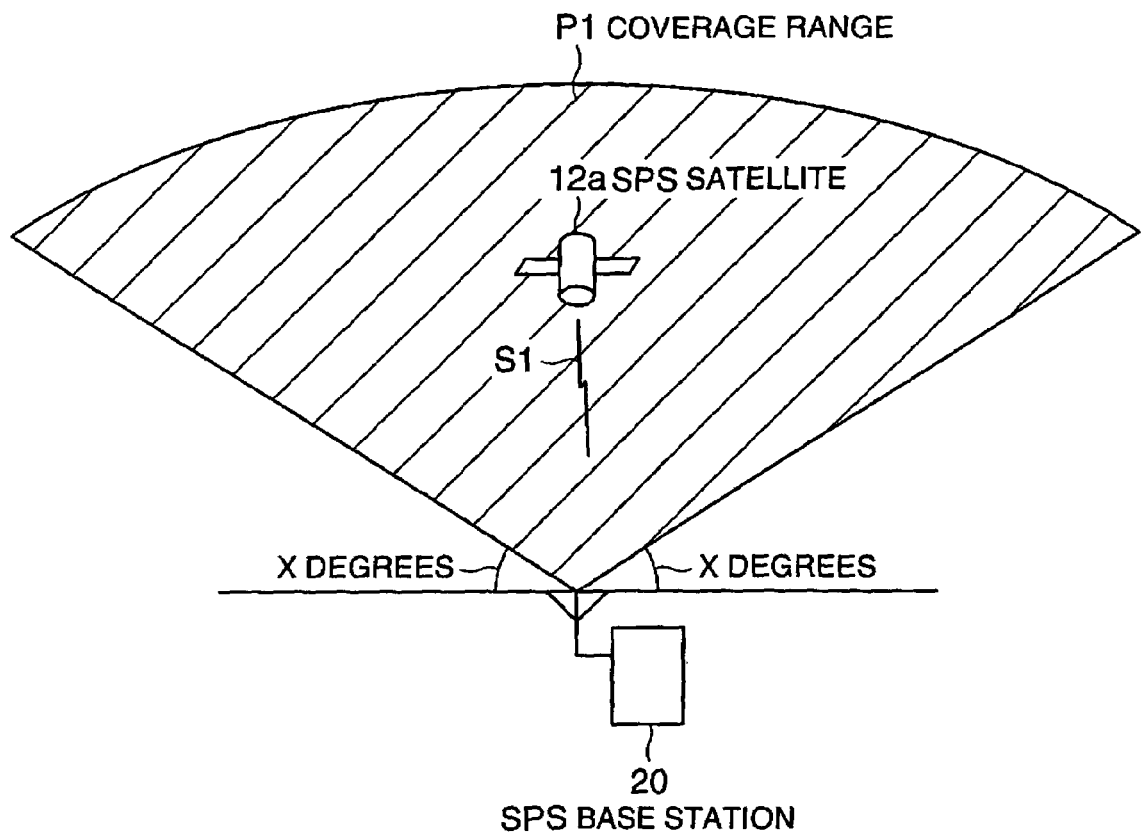
FIG. 10 is a view of a schematic diagram showing the method of determining the validity of the satellite information in accordance with the present invention.
FIG. 11 is a view of a diagram showing an example of cache invalidation information of the cache system.

FIG. 10 is a view of a schematic diagram showing the method by which the assistant server 30 determines the validity of the satellite information 232A. As shown in FIG. 10, a coverage range P1 is an example of the coverage area within which the SPS base station 20 can receive the signals S1 to S24 from the SPS satellites 12a to 12x existing in the sky. The coverage range P1 is defined by the position of the SPS base station 20 and an elevation angle of X degrees that is the range of angle within which the SPS base station 20 receives the signals S1 to S24. The assistant server 30 causes the server communication section 204 to acquire coverage range information 242 indicative of this coverage range P1 from the SPS base station 20 and has the coverage range information 242 stored in the server third storage section 240. This coverage range information 242 is an example of the coverage area information, and the server third storage section 240 is an example of the coverage area information storage device.

Based on the aforesaid satellite information validity determination program 214 (see FIG. 8), the server control section 200 identifies the position of the SPS satellite 12a from the server-side satellite information 232A for example, and determines whether or not the SPS satellite 12a is positioned within the coverage range P1 of the SPS base station 20. In other words, the satellite information validity determination program 214 and the server control section 200 are examples of the in or out of coverage area determination device.

Here, as shown in FIG. 10, as long as the SPS satellite 12a exists within the coverage range P1 and transmits the signal S1, the SPS base station 20 should receive the signal S1 from the SPS satellite 12a. Accordingly, the SPS base station 20 should be able to transmit to the assistant server 30 the satellite information corresponding to the SPS satellite 12a.

In contrast, if the SPS satellite 12a exists within the coverage range P1 and the SPS base station 20 cannot transmit the satellite information corresponding to the SPS satellite 12a, it would be assumed that the SPS base station 20 would not receive the signal S1 from the SPS satellite 12a due to a malfunction or the like. In other words, when the SPS satellite 12a is in the range P1 and the assistant server 30 does not receive information, the reason is considered to be that the SPS satellite 12a cannot transmit the signal S1 due to a malfunction.

Consequently, based on the satellite information validity determination program 214, the server control section 200 shown in FIG. 8 determines when it cannot receive from the SPS base station 20 the satellite information corresponding to the SPS satellite 12a existing within the coverage range P1 corresponding to the SPS base station 20 that the satellite information corresponding to the SPS satellite 12a is invalid.

For example, as shown in FIG. 7B, when the SPS satellite 12a exists within the coverage range P1 corresponding to the SPS base station 20, the satellite information corresponding to the satellite ID 1 of the SPS satellite 12a does not exist in the satellite information 122B received from the SPS base station 20. In this case, the server control section 200 determines that the satellite information corresponding to the SPS satellite 12a is invalid.

As shown in FIG. 8, the assistant server 30 has a cache information update program 216. The cache information update program 216 is information for updating, for example, the satellite information 232A (see FIG. 9A), which the server control section 200 has stored into the server second storage section 230 shown in FIG. 8. In other words, the cache information update program 216 and the server control section 200 are examples of the satellite information update device.

Specifically, based on the cache information update program 216, for example, when the satellite information corresponding to the SPS satellite 12a is invalid, the server control section 200 updates the server-side satellite information 232A (see FIG. 9A) stored in the server second storage section 230 shown in FIG. 8, by deleting the satellite information corresponding to the satellite ID 1 of the SPS satellite 12a. Thus, the server control section 200 generates new server-side satellite information 232B (see FIG. 9B).

Besides, based on the cache information update program 216, the server control section 200 updates the assistant information 234 stored in the server second storage section 230 shown in FIG. 8, by deleting the assistant information corresponding to the SPS satellite 12a.

As shown in FIG. 8, the assistant server 30 has a cache invalidation information generation program 218. The cache invalidation information generation program 218 is information used in order for the server control section 200 to generate cache invalidation information 236 indicating that the satellite information needs to be updated, based on the determination result by the aforesaid satellite information validity determination program 214. This cache invalidation information 236 is an example of the satellite information update notification information. Further, the cache invalidation information generation program 218 and the server control section 200 are examples of the satellite information update notification information generation device. The server control section 200 stores the generated cache invalidation information 236 into the server second storage section 230 shown in FIG. 8.

FIG. 11 is a view of a diagram showing an example of the cache invalidation information 236.

As shown in FIG. 11, the cache invalidation information 236 is information for identifying the SPS satellites 12a to 12x stopped delivering the signals S1 to S24, and is information indicating, for example, only the invalidation of the satellite information corresponding to the specific GPA satellites 12a to 12x and an invalidation target satellite ID indicative of the satellite ID of the SPS satellite 12a. Consequently, the cache invalidation information 236 has a very small amount of information. Accordingly, it is possible to minimize the burden on the assistant server and the like caused by transmission and reception of the cache invalidation information 236. Besides, it is possible to shorten the time of transmission and reception of the cache invalidation information 236.

The assistant server 30 transmits this cache invalidation information 236 to a delivery destination to be described below.

As shown in FIG. 8, the assistant server 30 has delivery destination information 246 stored in the server third storage section 240.

FIG. 12 is a view of a diagram showing examples of the delivery destination information 246. As shown in FIG. 12, the delivery destination information 246 is information indicating the nodes of the network controller 60 and plurality of terminals 80a to 80c shown in FIG. 1 that serve as targets to be provided with the assistant information 234A and the cache invalidation information 236. The delivery destination information 246 has a hierarchical structure such that, for example, the plurality of terminals 80a to 80c belongs to a lower hierarchy than the network controller 60. Here, the network controller 60 is the host node of the terminals 80a to 80c. This delivery destination information 246 is an example of the provision target terminal information, and the server third storage section 240 is an example of the provision target terminal information storage device.

As shown in FIG. 12, the individual nodes are represented by node IDs such as bb11. Further, delivery time information and delivery satellite IDs are indicated in the delivery destination information 246 in response to bb11, etc. referring to the individual node IDs of the terminals 80a to 80c. The delivery time information indicates the time of the preceding delivery of the communication address, assistant information 234A, or cache invalidation information 236. Further, the delivery satellite IDs indicate the IDs of the SPS satellites 12a to 12x corresponding to the delivered satellite information. Thus, the assistant server 30 can hold a record of when and to which node it has delivered the assistant information 234 corresponding to which of the SPS satellites 12a etc.

As shown in FIG. 8, the assistant server 30 has an assistant information transmission program 220. The assistant information transmission program 220 is information used in order for the server control section 200 to transmit the assistant information 234A to the terminals 80a to 80c via the network controller 60 that is the delivery destination indicated in the delivery destination information 246. In other words, the assistant information transmission program 220 and the server control section 200 are examples of the positioning auxiliary information transmission device. Thus, the assistant server 30 can transmit the assistant information 234A etc. to the individual nodes of the terminals 80a to 80c via the network controller 60 shown in FIG. 1 that is the host node.

As shown in FIG. 8, the assistant server 30 has a cache invalidation information transmission program 222. The cache invalidation information transmission program 222 is information used in order for the server control section 200 to transmit the cache invalidation information 236 to the individual nodes of the network controller 60 or the like that are the delivery destinations indicated in the delivery destination information 246. In other words, the cache invalidation information transmission program 222 and the server control section 200 are examples of the satellite information update notification information transmission device. Thus, the assistant server 30 can transmit the cache invalidation information 236 to the individual nodes of the terminals 80a to 80c via the network controller 60 shown in FIG. 1. In other words, the delivery destination to which the assistant server 30 directly transmits the cache invalidation information 236 is the network controller 60 alone, so that the amount of information transmitted by the assistant server 30 requires only its lowest limit.

As mentioned, part or all of the server-side satellite information 232A is invalidated because it has stopped being delivered and for such reasons, and thus the assistant server 30 determines that the server-side satellite information 232A needs to be updated. Then, the assistant server 30 generates the cache invalidation information 236 indicative of the need to update the satellite information possessed by the individual nodes of the network controller 60 and the like. Thus the assistant server 30 transmits only the cache invalidation information 236 to the terminals 80a to 80c shown in FIG. 1 via the network controller 60 that is the host node. Consequently, only the information indicating that the satellite information needs to be updated can be provided at the time the satellite information need be updated.

When transmitting the cache invalidation information 236, the assistant server 30 also transmits the delivery destination information 246. Thereby, the network controller 60 can be supplied with the information about the terminals 80a to 80c that are the delivery destinations.

Besides, as mentioned, the assistant server 30 can hold a record of when and to which node it has delivered the assistant information 234 corresponding to which of the SPS satellites 12a to 12x. Therefore, only the terminals 80a to 80c having the satellite information about a specific satellite indicated in the cache invalidation information 236 are included in the delivery destination information 246, thereby enabling a reduction in the amount of transmission between the network controller 60 and the terminals 80a to 80c.

Furthermore, the assistant server 30 can update the satellite information 232A stored in the cache memory of the server second storage section 230 of the assistant server 30 per se. Thereby, the assistant information 234, etc. generated based on the latest satellite information can be provided even upon receipt of inquiries from the terminals that are not indicated in the delivery destination information 246 (see FIG. 8).

(Main Software Configuration of Network Controller 60)

Figure 13:
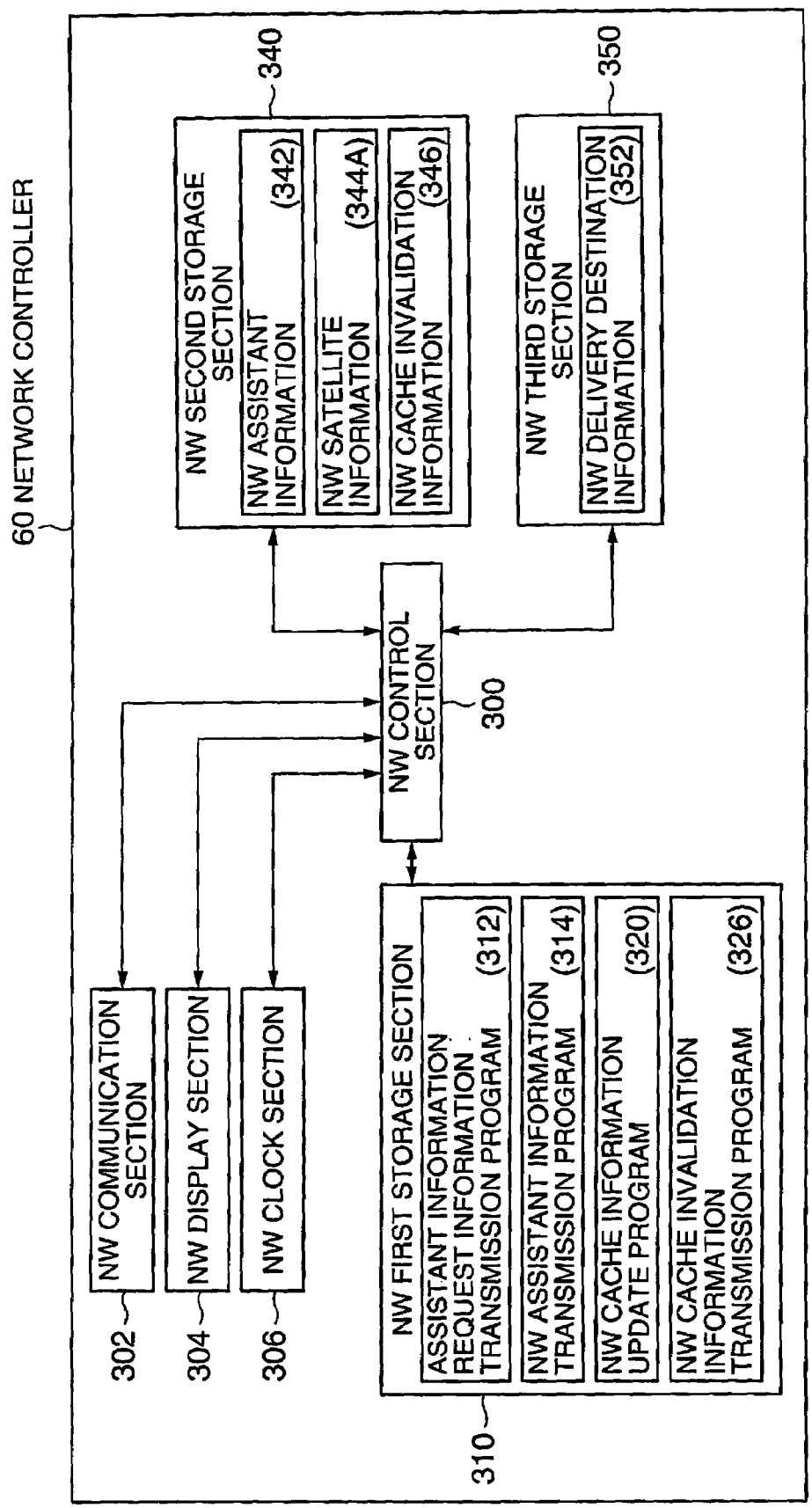
FIG. 13 is a view of a schematic diagram showing the main software configuration of the network controller.

FIG. 13 is a view of a schematic diagram showing the main software configuration of the network controller 60. As shown in FIG. 13, the network controller 60 has an NW control section 300, an NW communication section 302, an NW display section 304, and an NW clock section 306. The NW control section 300 to controls of individual sections. Referring now to FIGS. 4 and 13, the NW communication section 302 corresponds to the communication device 74 shown in FIG. 4. The NW display section 304 corresponds to the display device 76 shown in FIG. 4. The NW clock section 306 corresponds to a clock 78 shown in FIG. 4. The letters NW used in the NW communication section 302, etc. mean the network controller.

As shown in FIG. 13, the network controller 60 has an NW first storage section 310 to store various programs therein, and an NW second storage section 340 and NW third storage section 350 that store a variety of information therein. The NW second storage section 340 is disposed in a storage device capable of high-speed reading, for example, a cache memory of an external storage device 68.

As shown in FIG. 13, the network controller 60 has an assistant information request information transmission program 312. The assistant information request information transmission program 312 is information used in order for the NW control section 300 to transmit assistant information request information to the assistant server 30 shown in FIG. 8. The assistant information request information is information for making a request to transmit the assistant information 234 (see FIG. 8) to the assistant server 30. Thus, the network controller 60 can make a request to transmit the assistant information 234 to the assistant server 30.

Upon receipt of the assistant information 234 from the assistant server 30, the network controller 60 stores it into the NW second storage section 340 as NW assistant information 342 (see FIG. 13). Accordingly, the NW assistant information 342 has the same content as the assistant information 234.

Further, the network controller 60 stores the server-side satellite information 234 (see FIG. 8) included in the assistant information 232A into the NW second storage section 340 as NW satellite information 344A (see FIG. 13). Here, the NW satellite information 344A has the same content as the server-side satellite information 232A. Accordingly, it can be said that the NW assistant information 342 includes the NW satellite information 344A.

As shown in FIG. 13, the network controller 60 has an NW assistant information transmission program 314. The NW assistant information transmission program 314 is information used in order for the NW control section 300 to transmit the NW assistant information 342 to the terminals 80a to 80c shown in FIG. 1. In other words, the assistant information transmission program 314 and the NW control section 300 are examples of the positioning auxiliary information transmission device. Thus, the network controller 60 can transmit the NW assistant information 342 to the terminals 80a to 80c.

As shown in FIG. 13, the network controller 60 has an NW cache information update program 320. The NW cache information update program 320 is information used in order for the NW control section 300 to update the NW satellite information 344A stored in the server second storage section 340 based on the cache invalidation information 236 acquired from the assistant server 30 shown in FIG. 8. In other words, the NW cache information update program 320 and the NW control section 300 are examples of the mediation device satellite information update device.

Upon acquisition of the cache invalidation information 236 (see FIG. 8) from the assistant server 30 shown in FIG. 8, then based on the NW cache information update program 320, the NW control section 300 updates the NW satellite information 344A by deleting therefrom, for example, the satellite information corresponding to the invalidation target satellite ID1, thus generating NW satellite information 344B (see FIG. 9B).

As shown in FIG. 13, the NW control section 300 stores the cache invalidation information 236 (see FIG. 8) acquired from the assistant server 30 shown in FIG. 8, into the NW second storage section 340 as NW cache invalidation information 346.

As shown in FIG. 13, the network controller 60 has NW delivery destination information 352 stored in the NW third storage section 350. The NW delivery destination information 352 is information indicative of the plurality of terminals 80a to 80c serving as mediation targets to be provided with the NW assistant information 342. These terminals 80a to 80c are examples of the mediation target terminal devices, and the NW delivery destination information 352 is an example of the mediation target terminal information. Further, the NW third storage device 350 is an example of the mediation target terminal information storage device.

The NW delivery destination information 352 has the same content as the delivery destination information 246 (see FIG. 12) possessed by the assistant server 30, but has only the information about the individual host nodes. In other words, the information of the network controller 60 per se is not included in the NW delivery destination information 352.

As shown in FIG. 13, the network controller 60 has an NW cache invalidation information transmission program 326. The NW cache invalidation information transmission program 326 is information used in order for the NW control section 300 to transmit the NW cache invalidation information 346 to the individual nodes of the terminals 80a to 80c that are the delivery destinations indicated in the NW delivery destination information 352. In other words, the NW cache invalidation information program 326 and the NW control section 300 are examples of the mediation device-side satellite information update notification information transmission device. Thus, the network controller 60 can transmit the NW cache invalidation information 346 to the individual nodes of the terminals 80a to 80c shown in FIG. 1.

(Main Software Configuration of Terminal 80a)

Figure 14:
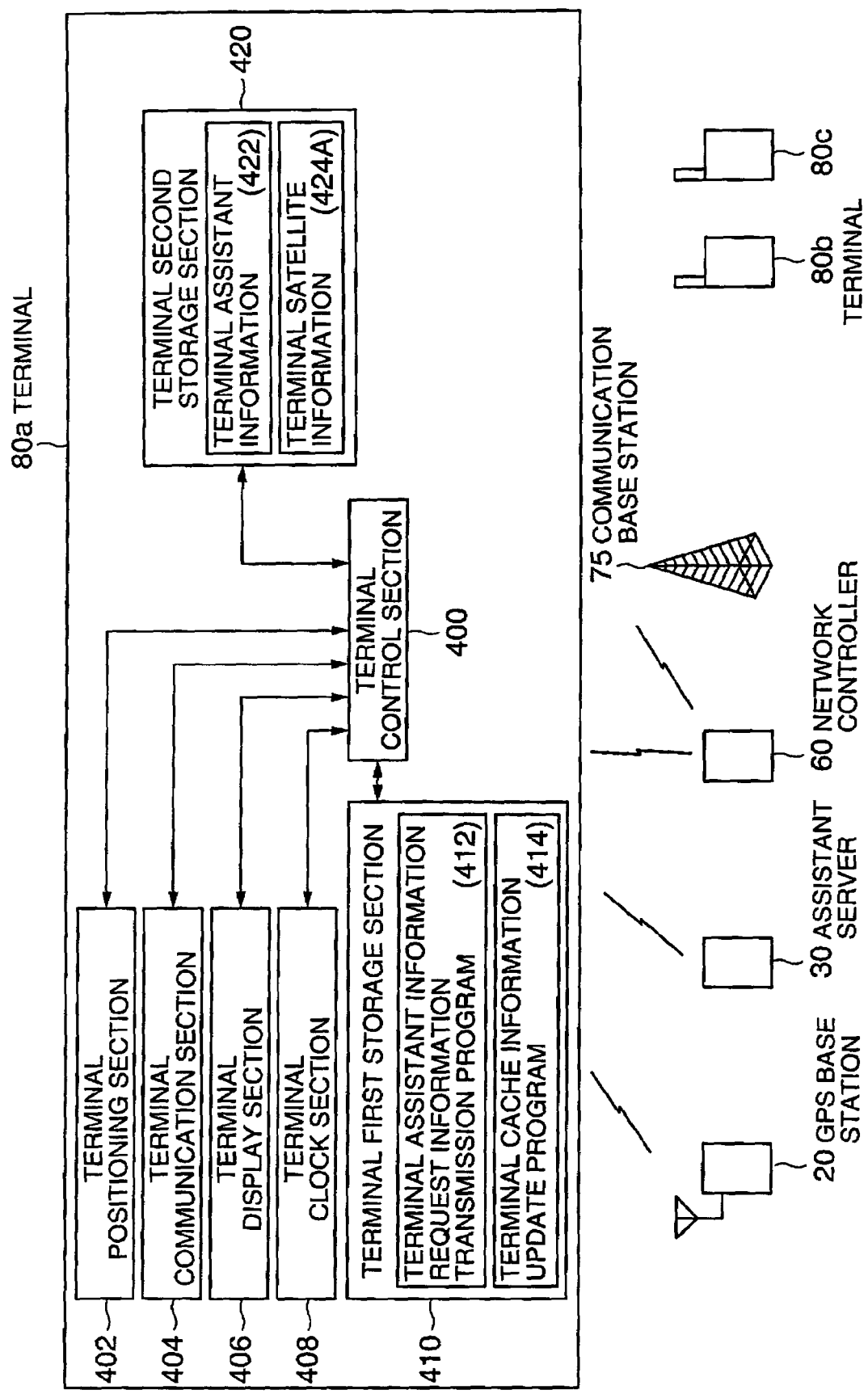
FIG. 14 is a view of a schematic diagram showing the main software configuration and connections of the terminal.

FIG. 14 is a view of a schematic diagram showing the main software configuration of the terminal 80a. As shown in FIG. 14, the terminal 80a has a terminal control section 400, a terminal positioning section 402, a terminal communication section 404, a terminal display section 406, and a terminal clock section 408. The terminal control section 400 controls individual sections. The terminal positioning section 402 corresponds to the SPS receiver 90 shown in FIG. 5. The terminal communication section 404 corresponds to the communication device 92 shown in FIG. 5. The terminal display section 406 corresponds to the display device 94 shown in FIG. 5. The terminal clock section 408 corresponds to a clock 96 shown in FIG. 5.

As shown in FIG. 14, the terminal 80a has a terminal first storage section 410 storing various programs therein and a terminal second storage section 420 storing a variety of information therein. The terminal second storage section 420 is disposed in a storage device capable of high-speed reading, for example, a cache memory of a storage device 86 shown in FIG. 5.

The terminals 80b and 80c have the same software configuration as the terminal 80a and thus are omitted from the description.

As shown in FIG. 14, the terminal 80a has a terminal assistant information request information transmission program 412. The terminal assistant information request information transmission program 412 is information used in order for the terminal control section 400 to make a request to transmit the assistant information 234 to the assistant server 30 shown in FIG. 8 via the network controller 60 shown in FIG. 13. Thus, the terminal 80a receives the NW assistant information 342 from the network controller 60 and stores it into the terminal second storage section 420 as terminal assistant information 422. As mentioned, the NW assistant information 342 is the information that the network controller 60 has acquired from the assistant server 30 and that indicates the same content as the assistant information 234. The terminal 80a utilizes the NW assistant information 342 to determine its current position.

Further, the terminal 80a stores the NW satellite information 344A included in the NW assistant information 342, into the terminal second storage section 420 as terminal satellite information 424A. In other words, the terminal second storage section 420 is an example of the terminal-side satellite information storage device. The terminal 80a utilizes this terminal satellite information 424A to perform a subsequent positioning operation.

As shown in FIG. 14, the terminal 80a has a terminal cache information update program 414. The terminal cache information update program 414 is information used in order for the terminal control section 400 to update the terminal satellite information 424A stored in the terminal second storage section 420 based on the NW cache invalidation information 344 acquired from the network controller 60 shown in FIG. 13. In other words, the terminal cache information update program 414 and the terminal control section 400 are examples of the terminal-side satellite information update device. The terminal cache information update program 414 has the same content as the NW cache information update program 320 (see FIG. 13) of the aforesaid network controller 60.

(Examples of Operation, etc. of Cache Update System 10 of this Embodiment)

The cache update system 10 is configured as above, and examples of the operation thereof will be described below.

Figure 15:
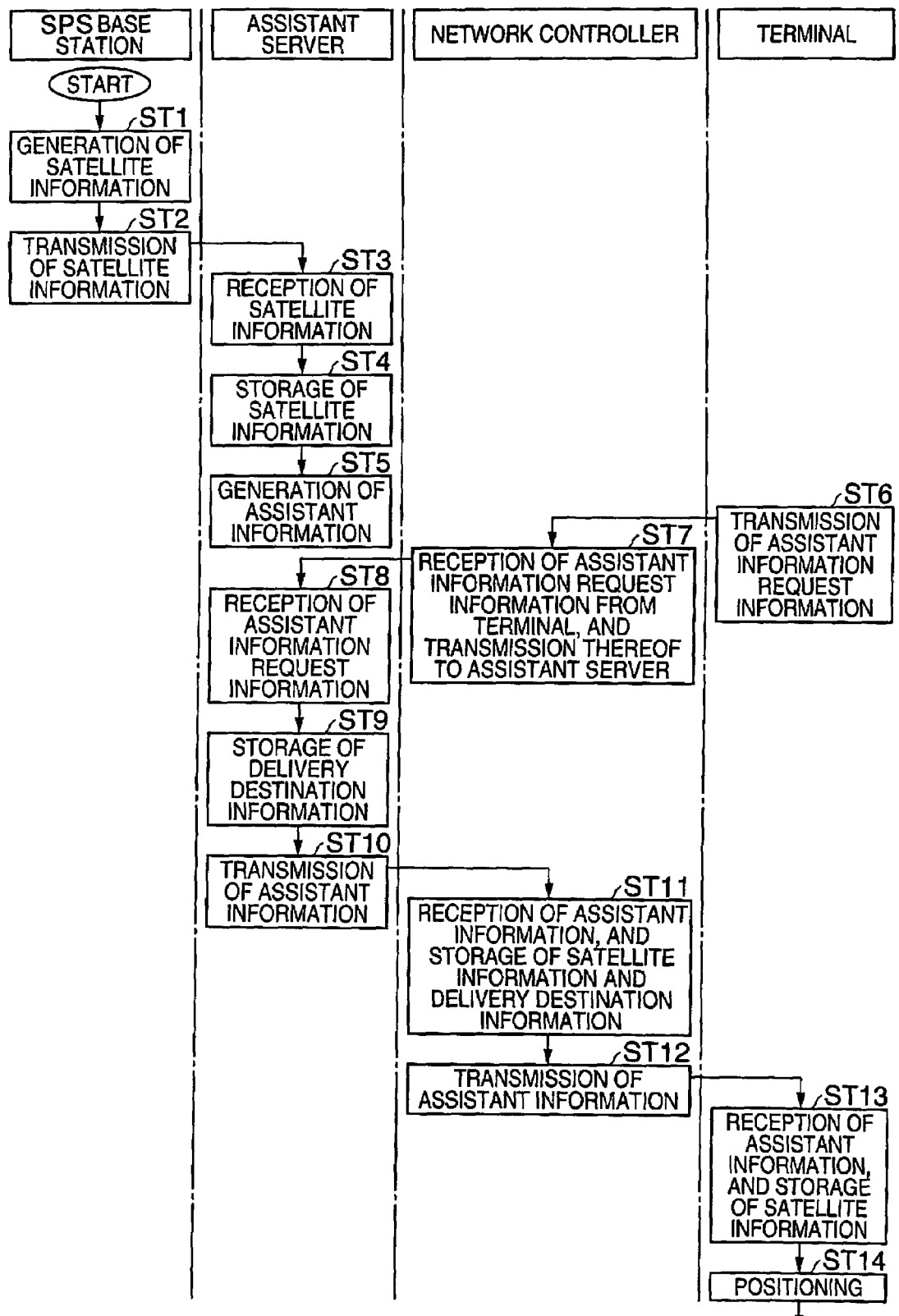
FIG. 15 is a view of a schematic flowchart showing examples of the operation of the cache update system.
Figure 16:
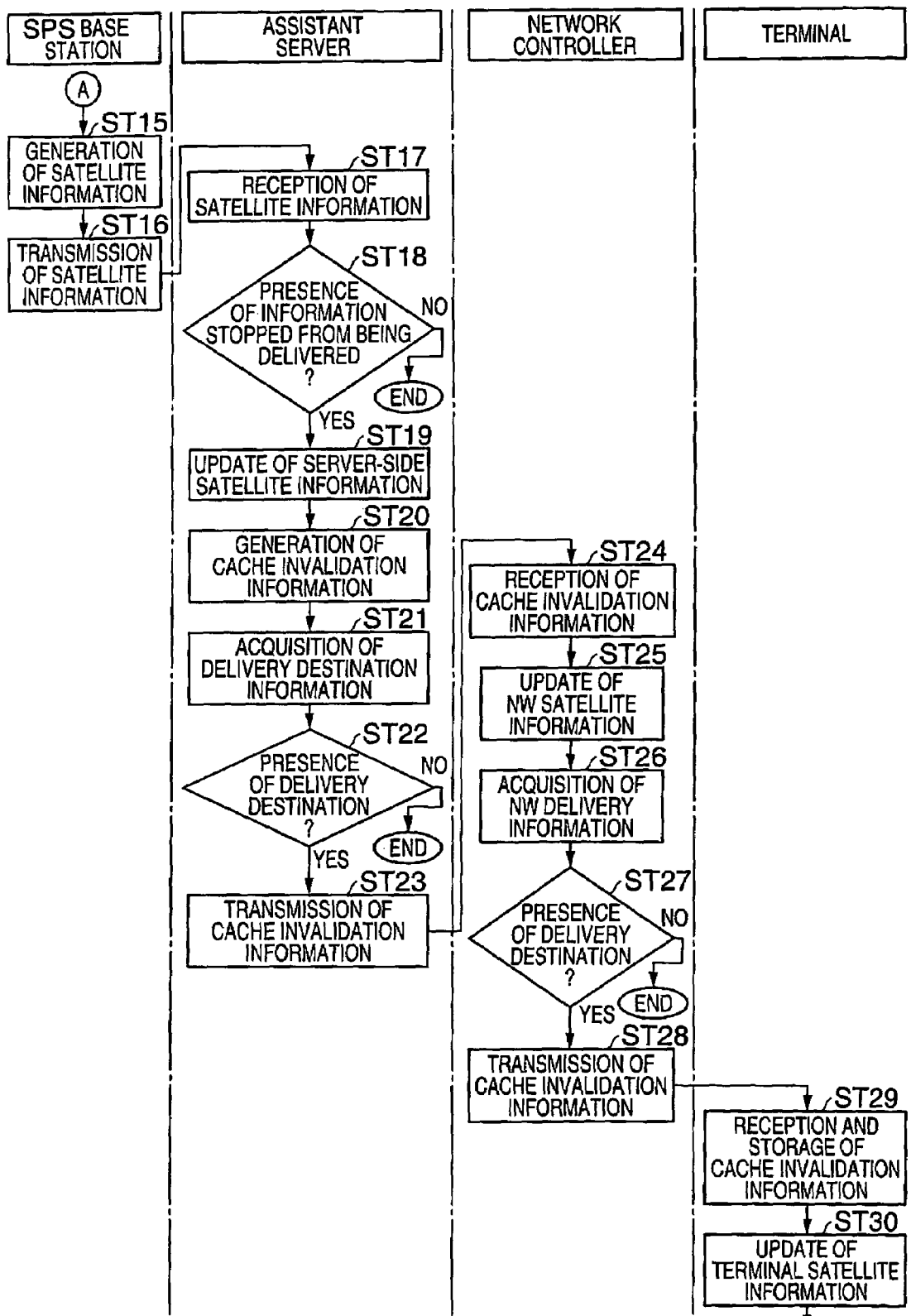
FIG. 16 is a view of a schematic flowchart showing examples of the operation of the cache update system.

FIGS. 15 and 16 are views of schematic flowcharts showing examples of the operation of the cache update system 10.

Referring to FIGS. 1 and 15, first, based on the signals S1 to S24 from the SPS satellites 12a to 12x, the SPS base station 20 generates, for example, the satellite information 122A shown in FIG. 7A (Step ST1 in FIG. 15). This Step ST1 is an example of the satellite information generation step.

Subsequently, the SPS base station 20 transmits the generated satellite information 122A to the assistant server 30 (Step ST2), and the assistant server 30 receives the satellite information 122A (Step ST3). This Step ST2 is an example of the satellite information acquisition step.

Subsequently, the assistant server 30 stores the received satellite information 122A into the server second storage section 230 as the server-side satellite information 232A (see FIG. 8) (Step ST4). This Step ST4 is an example of the satellite information storage step.

Referring now to FIGS. 8 and 15, subsequently, the assistant server 30 generates the assistant information 234 including the server-side satellite information 232A (Step ST5). This Step ST5 is an example of the auxiliary information generation step.

Referring again to FIGS. 1 and 15, subsequently, when the terminal 80a shown in FIG. 1 transmits the assistant information request information to the network controller 60 (Step ST6), the network controller 60 receives the assistant information request information and transmits it to the assistant server 30 (Step ST7).

Subsequently, upon receipt of the assistant information request information (Step ST8), the assistant server 30 generates the delivery destination information 246 (see FIG. 12) indicative of the communication addresses, etc. of the network controller 60 and terminal 80a, and stores it into the server third storage section 240 shown in FIG. 8 (Step ST9).

Subsequently, the assistant server 30 transmits to the network controller 60 the assistant information 234 stored in the server second storage section 230 shown in FIG. 8 (Step ST10). On this occasion, the assistant server 30 also transmits the delivery destination information 246. This Step ST10 is an example of the positioning auxiliary information transmission step of transmitting the assistant information to the terminals 80a etc. via the network controller 60.

Subsequently, the network controller 60 receives the assistant information 234 and the delivery destination information 246, and stores them as the NW assistant information 342 and the NW delivery destination information 352 (see FIG. 13) (Step ST11). On this occasion, the network controller 60 stores the server-side satellite information 232A included in the assistant information 234, into the NW second storage section 340 as the NW satellite information 344A.

Subsequently, the network controller 60 transmits the NW assistant information 342 to the terminal 80a that has transmitted the assistant information request information (Step ST12).

Subsequently, the terminal 80a receives the NW assistant information 342 and stores it into the terminal second storage section 420 as the terminal assistant information 422 (see FIG. 14) (Step ST13). On this occasion, the terminal 80a stores the NW satellite information 344A included in the NW assistant information 342 into the terminal second storage section 420 as the terminal satellite information 424A.

Subsequently, the terminal 80a utilizes the terminal assistant information 422 to receive the signals S1 to S24 from the SPS satellites 12a to 12x shown in FIG. 1, thus determining its current position (Step ST 14).

Hereafter, the terminal 80a can continuously or periodically perform positioning operations by utilizing the terminal satellite information 424A stored in the terminal second storage section 420.

However, part or all of the terminal satellite information 424A is invalidated in some cases. The following description relates to the method of updating the terminal satellite information 424A etc. in such cases.

A description will hereinafter be given on condition that the SPS satellite 12a shown in FIG. 1 cannot transmit the signal S1 due to a malfunction although it exists within the coverage range P1 (see FIG. 10) of the SPS base station 20.

Referring now to FIGS. 1 and 16, the SPS base station 20, which has received the signal S2 to S24 from the SPS satellite 12b etc. shown in FIG. 1, generates the satellite information 122B (see FIG. 7B) (Step ST15 in FIG. 16) and transmits it to the assistant server 30 (Step ST16). The aforesaid Step ST15 is also an example of the satellite information generation step.

Subsequently, the assistant server 30 receives the satellite information 122B (Step ST17). This Step ST17 is also an example of the satellite information acquisition step.

Subsequently, the assistant server 30 determines whether or not there exist the SPS satellites 12a to 12x that have stopped delivering the satellite information (Step ST18). When there exist SPS satellites 12a to 12x that have stopped delivering the signals S1 to S24 the server-side satellite information 232A needs to be updated. In other words, Step ST18 is an example of the satellite information update necessity determination step.

As mentioned, in this example the SPS satellite 12a does not transmit the signal S1 although it exists within the coverage range P1 (see FIG. 10) of the SPS base station 20. Therefore, the satellite information corresponding to the SPS satellite 12a is not included in the satellite information 122B (see FIG. 7B) that the assistant server 30 has acquired from the SPS base station 20. Accordingly, the assistant server 30 determines that the server-side satellite information 232A needs to be updated, and thus updates the server-side satellite information 232A (Step ST19). This Step ST19 is an example of the satellite information update step.

Subsequently, the assistant server 30 generates the cache invalidation information 236 (see FIG. 8) (Step ST20). This Step ST20 is an example of the satellite information update notification information generation step.

Subsequently, the assistant server 30 acquires the delivery destination information 246 (see FIG. 13) from the server third storage section 240 (Step ST21) and determines that there exist the delivery destinations, such as the network controller 60 and terminal 80a, that are identified by the individual nodes ID (Step ST22). Then, the assistant server 30 transmits the cache invalidation information 236 to the network controller 60 that is the host node (Step ST23). This Step ST23 is the step in which the assistant server 30 transmits the cache invalidation information 236 to the plurality of terminals 80a to 80c via the network controller 60, and is an example of the satellite information update notification information transmission step.

Subsequently, the network controller 60 receives the cache invalidation information 236 (Step ST24) and updates the NW satellite information 344A (see FIG. 9A) to the NW satellite information 344B (see FIG. 9B) (Step ST25). This Step ST25 is an example of the mediation device satellite information update step. The network controller 60 stores the acquired cache invalidation information into the NW second storage section 340 as the NW cache invalidation information 346. Subsequently, the network controller 60 acquires the NW delivery destination information 352 from the NW third storage section 350 (Step ST26) and, upon determining that there exists delivery destinations (Step ST27), transmits the NW cache invalidation information 346 to the terminals 80a to 80c (Step ST28). This Step ST28 is an example of the mediation device-side satellite information update notification information transmission step. At Step ST28, the network controller 60 transmits the NW cache invalidation information 346 to all the delivery destinations that are included in the NW delivery destination information 352.

Subsequently, the terminals 80a to 80c receive the NW cache invalidation information 346 (Step ST29) and updates the terminal satellite information 422A (see FIG. 9A) to provide the terminal satellite information 424B (see FIG. 9B) (Step ST30). This Step ST30 is an example of the terminal-side satellite information update step.

The above Steps make it possible that only the information indicating that the satellite information need be updated is provided at the time the satellite information need be updated, and that the terminals 80a to 80c receive the NW cache invalidation information 346 and update the satellite information only when the satellite information need be updated.

As used herein, the following directional terms "forward, rearward, above, downward, vertical, horizontal, below, and transverse" as well as any other similar directional terms refer to those directions of a device equipped with the present invention. Accordingly, these terms, as utilized to describe the present invention should be interpreted relative to a device equipped with the present invention.

SECOND EMBODIMENTS

A second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

(Second Embodiment)

Referring to FIG. 1, a description will now be given of a cache update system 10A according to a second embodiment. The cache update system 10A of the second embodiment has many common configurations to the cache update system 10 of the aforesaid first embodiment. Therefore, common portions are identified by the same reference numerals and thus omitted from the description, and the following description is focused on the differences.

Figure 17:
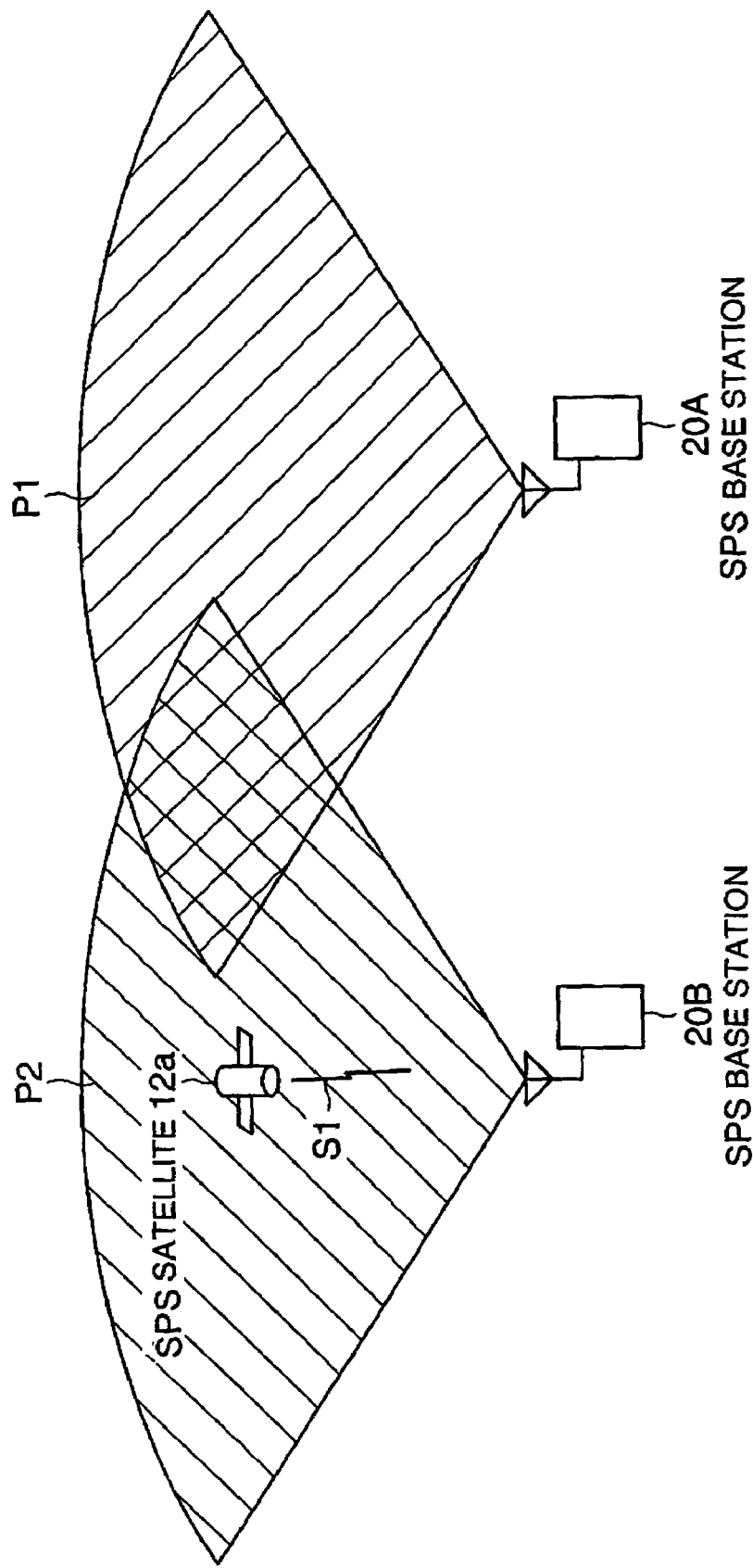
FIG. 17 is a view of a schematic diagram showing the method by which the assistant server determines the validity of the satellite information.

FIG. 17 is a view of a schematic diagram showing the method of how an assistant server 31 of the second embodiment determines the validity of the satellite information.

A satellite information validity determination program 214A (see FIG. 8) possessed by the assistant server 31 of the cache update system 10A of the second embodiment is mainly different in the following respects from the satellite information validity determination program 214 possessed by the assistant server 30 of the cache update system 10 of the aforesaid first embodiment.

Specifically, based on the satellite information validity determination program 214A, the server control section 200 determines, for example, when it cannot receive the satellite information corresponding to a specific SPS satellite, e.g., the SPS satellite 12a, from any of the plurality of SPS base stations 20A and 20B shown in FIG. 17, that the satellite information corresponding to the SPS satellite 12a is invalid.

For example, it is considered that the assistant server 31 may make an error in determining whether or not the SPS satellite 12a exists within the coverage range P1 of the SPS base station 20A, due to the error or the like in a navigation message including the satellite orbit information, etc. that is carried on the signals S1 to S24 from the SPS satellites 12a to 12c. When the satellite information corresponding to the SPS satellite 12a is determined invalid although the SPS satellite 12a exists out of the coverage range P1 while transmitting the signal S1, it becomes impossible to use the originally valid satellite information. In other words, as shown in FIG. 17, when the SPS satellite 12a exists within a coverage range P2 of the SPS base station 20B, it should be determined whether or not the delivery of the signal S1 from the SPS satellite 12a has stopped to invalidate the satellite information based on whether or not the SPS base station 20B, instead of the SPS base station 20A, receives the satellite information corresponding to the SPS satellite 12a.

Thereupon, based on the satellite information validity determination program 214A, the server control section 200 (see FIG. 8) of the assistant server 31 does not determine that the satellite information corresponding to the SPS satellite 12a is invalid even when it cannot receive from the SPS base station 20A shown in FIG. 17 the satellite information corresponding to the SPS satellite 12a, but determines that the satellite information corresponding to the SPS satellite 12a is invalid when it cannot receive even from the SPS base station 20B the satellite information corresponding to the SPS satellite 12a. This makes it possible to prevent the originally valid satellite information from being erroneously determined invalid.

Furthermore, based on the satellite information validity determination program 214A, the server control section 200 (see FIG. 8) of the assistant server 31 determines that the satellite information corresponding to the SPS satellite 12a is invalid when it is unable to receive from the SPS base station 20A or the SPS base station 20B, the satellite information corresponding to the SPS satellite 12a within a predetermined allowable time, e.g., 60 seconds. This time period of 60 seconds is an example of the allowable time range. In other words, it the condition in which the SPS base stations 20A and 20B cannot receive the signals S1 etc. from the SPS satellites 12a to 12x is not limited to the case in which the SPS satellites 12a to 12x malfunction and such cases. For example, when an obstacle such as a high-rise building exists between one of the SPS base stations 20A or 20B and the SPS satellite 12a, when the signal S1 weakens temporarily, or in such cases, a condition in which the SPS base stations 20A or 20B cannot receive the signal S1 from the SPS satellite 12a occurs. In this case, the satellite information corresponding to the SPS satellite 12a can be used because it is valid information. Further, it is for only a certain time that the signal S1 is blocked by an obstacle such as a high-rise building. In other words, the condition in which the signal S1 is blocked by an obstacle such as a high-rise building should be eliminated after the certain amount of time elapses. A phenomenon in which the signals S1 to S24 weaken temporarily should also be similarly eliminated after a certain time elapses.

In this respect, when being unable to receive from the SPS base station 20A or the SPS base station 20B the satellite information corresponding to the SPS satellite 12a within the predetermined allowable time, the assistant server 31 determines that the satellite information corresponding to the SPS satellite 12a is invalid. Therefore, the assistant server 31 can reliably determine whether the satellite information is invalid or not.

Unlike the example shown in this embodiment, the configuration may also be such that the communication base station 75 shown in FIG. 1 also has satellite information stored therein and that the stored satellite information is updated based on the NW cache invalidation information 346 from the network controller 60.

(Program, Computer Readable Recording Medium, etc.)

A control program of the positioning auxiliary information provision device to allow the computer to conduct the aforesaid operation examples: the satellite information acquisition step, satellite information storage step, auxiliary information generation step, positioning auxiliary information transmission step, satellite information update necessity determination step, satellite information update step, satellite information update notification information generation step, satellite information update notification information transmission step, etc.

Besides, a computer readable recording medium or the like having recorded therein such a control program of the positioning auxiliary information provision device can be provided.

A program storage medium, which is used to enable the control program of the positioning auxiliary information provision device to be installed into and carried out by the computer can be realized with, for example, not only a package medium, such as a flexible disc like a floppy (registered trademark), a CD-ROM (Compact Disc Read Only Memory), a CD-R (Compact Disc-Recordable), a CD-RW (Compact Disc-Rewritable), and a DVD (Digital Versatile Disc), but also a semiconductor memory, a magnetic disc, or a magneto optical disc in each of which a program is stored on a temporary or permanent basis.

The invention is not limited to the aforesaid embodiments. Furthermore, the invention may be configured by combining the aforesaid embodiments together.

The term "configured" as used herein to describe a component, section or part of a device includes hardware and/or software that is constructed and/or programmed to carry out the desired function.

Moreover, terms that are expressed as "means-plus function" in the claims should include any structure that can be utilized to carry out the function of that part of the present invention.

The terms of degree such as "substantially," "about," and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A satellite information update system comprising:
    a satellite base station having a satellite information generation device to generate satellite information based on a position-related signal from a Satellite Positioning System;
    a positioning auxiliary information provision device being configured to communicate with said satellite base station; and
    a plurality of terminal devices being configured to communicate with said positioning auxiliary information provision device via a mediation device to mediate communication,
    said positioning auxiliary information provision device includes,
        a satellite information acquisition device being configured to acquire said satellite information from said satellite base station,
        a satellite information storage device being configured to store said satellite information,
        an auxiliary information generation device being configured to generate positioning auxiliary information including said satellite information,
        a satellite information update necessity determination device being configured to determine said necessity of updating said satellite information,
        a satellite information update device being configured to update said satellite information stored in said satellite information storage device based on a determination result of said satellite information update necessity determination device,
        a satellite information update notification information generation device being configured to generate satellite information update notification information indicating said satellite information needs to be updated based on said determination result of said satellite information update necessity determination device,
        a provision target terminal information storage device being configured to store provision target terminal information indicative of said plurality of terminal devices serving as targets to be provided with said positioning auxiliary information and said satellite information update notification information,
        a positioning auxiliary information transmission device being configured to transmit said positioning auxiliary information via said mediation device to said terminal devices indicated in said provision target terminal information, and
        a satellite information update notification information transmission device being configured to transmit said satellite information update notification information via said mediation device to said terminal devices indicated in said provision target terminal information, and said mediation device includes,
        a mediation device-side satellite information storage device being configured to store said satellite information included in said positioning auxiliary information acquired from said positioning auxiliary information provision device,
        a mediation device-side satellite information update device being configured to update said satellite information stored in said mediation device-side satellite information storage device based on said satellite information update notification information acquired from said positioning auxiliary information provision device,
        a mediation target terminal information storage device being configured to store mediation target terminal information indicative of mediation target terminal devices that are said plurality of terminal devices serving as mediation targets to be provided with said positioning auxiliary information,
        a positioning auxiliary information transmission device being configured to transmit said positioning auxiliary information received from said positioning auxiliary information provision device to said terminal devices indicated in said mediation target terminal information, and
        a mediation device-side satellite information update notification information transmission device being configured to transmit said satellite information update notification information received from said positioning auxiliary information provision device to said terminal devices indicated in said mediation target information, and each of said terminal devices includes,
        a terminal-side satellite information storage device being configured to store said satellite information included in said positioning auxiliary information acquired via said mediation device from said positioning auxiliary information provision device, and
        a terminal-side satellite information update device being configured to update said satellite information stored in said terminal-side satellite information storage device based on said satellite information update notification information acquired via said mediation device from said positioning auxiliary information provision device.

2. A positioning auxiliary information provision device being configured to communicate with a satellite base station having satellite information generation device to generate satellite information based on a position-related signal from a position information satellite, said positioning auxiliary information provision device comprising:
    a satellite information acquisition device being configured to acquire the satellite information from the satellite base station;
    a satellite information storage device being configured to store the satellite information;
    an auxiliary information generation device being configured to generate positioning auxiliary information including the satellite information;
    a satellite information update necessity determination device being configured to determine the necessity of updating the satellite information;
    a satellite information update device being configured to update the satellite information stored in said satellite information storage device based on a determination result of said satellite information update necessity determination device;

a satellite information update notification information generation device being configured to generate satellite information update notification information indicating that the satellite information need be updated based on said determination result of said satellite information update necessity determination device;

a provision target terminal information storage device being configured to store provision target terminal information indicative of a plurality of terminal devices serving as targets to be provided with said positioning auxiliary information and said satellite information update notification information;

a positioning auxiliary information transmission device being configured to transmit said positioning auxiliary information via a mediation device to mediate said communication to said terminal devices indicated in said provision target terminal information; and a satellite information update notification information transmission device to transmit said satellite information update notification information via said mediation device to said terminal devices indicated in said provision target terminal information.

3. The positioning auxiliary information provision device according to claim 2, wherein
said satellite information update necessity determination device is configured to determine whether all or part of the satellite information is invalid or not.

4. The positioning auxiliary information provision device according to claim 3, further comprising,
a coverage area information storage device configured to store coverage area information indicative of a coverage area within which said satellite base station is configured to receive said position-related signal from said position information satellite, and
an in or out of coverage area determination device to determine whether or not said position information satellite is positioned within said coverage area, wherein
said satellite information update necessity determination device is configured to determine that satellite information corresponding to said position information satellite is invalid when it cannot receive from said satellite base station satellite information corresponding to said position information satellite existing within said coverage area corresponding to said satellite base station.

5. The positioning auxiliary information provision device according to claim 4, wherein
said satellite information update necessity determination device is configured to determine that the satellite information corresponding to said position information satellite is invalid when it cannot receive from any of a plurality of said satellite base stations satellite information corresponding to said position information satellite.

6. The positioning auxiliary information provision device according to claim 5, wherein said satellite information update necessity determination device is configured to determine that the satellite information corresponding to said position information satellite is invalid when the satellite information corresponding to said position information satellite cannot be received within an allowable time range.

7. The positioning auxiliary information provision device according to claim 4, wherein said satellite information update necessity determination device is configured to determine that the satellite information corresponding to said position information satellite is invalid when the satellite information corresponding to said position information satellite cannot be received within an allowable time range.

8. A positioning auxiliary information provision device control method comprising:
acquiring satellite information from a satellite base station by a positioning auxiliary information provision device being configured to communicate with said satellite base station to generate said satellite information based on a position-related signal from a position information satellite;
storing said satellite information in a satellite information storage device using said positioning auxiliary information provision device;
generating positioning auxiliary information including said satellite information using said positioning auxiliary information provision device;
transmitting said positioning auxiliary information via a mediation device to mediate said communication to a plurality of terminal devices serving as targets to be provided with said positioning auxiliary information using said positioning auxiliary information provision device;
determining the necessity of updating said satellite information using said positioning auxiliary information provision device;
updating said satellite information when determining in the necessity of updating said satellite information that said satellite information need be updated using said positioning auxiliary information provision device to update said satellite information stored in satellite information storage device;
generating satellite information update notification information when determining the necessity of updating said satellite information that said satellite information needs to be updated by said positioning auxiliary information provision device indicating said satellite information needs to be updated; and
transmitting said satellite information update notification information via said mediation device to said plurality of terminal devices serving as targets to be provided with said satellite information update notification information.

9. A positioning auxiliary information provision device control program adapted to run on a computer comprising:
code for acquiring satellite information from a satellite base station by a positioning auxiliary information provision device being configured to communicate with said satellite base station to generate said satellite information based on a position-related signal from a position information satellite;
code for storing said satellite information in a satellite information storage device using said positioning auxiliary information provision device;
code for generating positioning auxiliary information including said satellite information using said positioning auxiliary information provision device;
code for transmitting said positioning auxiliary information via a mediation device to mediate said communication to a plurality of terminal devices serving as targets to be provided with said positioning auxiliary information using said positioning auxiliary information provision device;
code for determining the necessity of updating said satellite information using said positioning auxiliary information provision device;
code for updating said satellite information when determining in the necessity of updating said satellite information that said satellite information need be updated using said positioning auxiliary information provision device to update said satellite information stored in satellite information storage device;

code for generating satellite information update notification information when determining the necessity of updating said satellite information that said satellite information needs to be updated by said positioning auxiliary information provision device indicating said satellite information needs be updated; and code for transmitting said satellite information update notification information via said mediation device to said plurality of terminal devices serving as targets to be provided with said satellite information update notification information.

10. A computer readable recording medium comprising:

a positioning auxiliary information provision device control program recorded therein, said positioning auxiliary information provision device control program adapted to run on a computer comprising code for acquiring satellite information from a satellite base station by a positioning auxiliary information provision device being configured to communicate with said satellite base station to generate said satellite information based on a position-related signal from a position information satellite, code for storing said satellite information in a satellite information storage device using said positioning auxiliary information provision device, code for generating positioning auxiliary information including said satellite information using said positioning auxiliary information provision device, code for transmitting said positioning auxiliary information via a mediation device to mediate said communication to a plurality of terminal devices serving as targets to be provided with said positioning auxiliary information using said positioning auxiliary information provision device, code for determining the necessity of updating said satellite information using said positioning auxiliary information provision device, code for updating said satellite information when determining in the necessity of updating said satellite information that said satellite information need be updated using said positioning auxiliary information provision device to update said satellite information stored in satellite information storage device, code for generating satellite information update notification information when determining the necessity of updating said satellite information that said satellite information needs to be updated by said positioning auxiliary information provision device indicating said satellite information needs be updated, and code for transmitting said satellite information update notification information via said mediation device to said plurality of terminal devices serving as targets to be provided with said satellite information update notification information.

11. The satellite information update system according to claim 1, wherein said plurality of terminal devices are configured to communicate with said positioning auxiliary information provision device via a mediation device to mediate communication via an Internet network and communication base station.

12. The positioning auxiliary information provision device according to claim 2, wherein said mediation device is configured to communicate to said terminal devices indicated in said provision target terminal information via an Internet network and communication base station.

13. The positioning auxiliary information provision device control method according to claim 8, wherein mediating by said mediation device is done via an Internet network and a communication base station.

14. The positioning auxiliary information provision device control program according to claim 9, wherein mediating by said mediation device is done via an Internet network and a communication base station.

15. The computer readable recording medium according to claim 10, wherein said positioning auxiliary information provision device control program includes code for transmitting said positioning auxiliary information via a mediation device to mediate said communication to a plurality of terminal devices via an Internet network and communication base station, said plurality of terminal devices serving as targets to be provided with said positioning auxiliary information using said positioning auxiliary information provision device.

* * * * *